(12) United States Patent
Park et al.

(10) Patent No.: US 12,460,837 B2
(45) Date of Patent: Nov. 4, 2025

(54) GAS FURNACE AND AIR CONDITIONER HAVING THE SAME

(71) Applicant: LG ELECTRONICS INC., Seoul (KR)

(72) Inventors: Janghee Park, Seoul (KR); Yongki Jeong, Seoul (KR); Jinwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 447 days.

(21) Appl. No.: 17/978,450

(22) Filed: Nov. 1, 2022

(65) Prior Publication Data
US 2023/0148075 A1    May 11, 2023

(30) Foreign Application Priority Data
Nov. 5, 2021    (KR) .......................... 10-2021-0151809

(51) Int. Cl.
| | | |
|---|---|---|
| *F24H 9/00* | (2022.01) | |
| *F24F 3/044* | (2006.01) | |
| *F24F 5/00* | (2006.01) | |
| *F24H 3/08* | (2022.01) | |
| *F24H 9/1881* | (2022.01) | |
| *F24F 13/20* | (2006.01) | |
| *F24H 3/10* | (2022.01) | |

(52) U.S. Cl.
CPC ........... *F24H 9/0063* (2013.01); *F24H 3/087* (2013.01)

(58) Field of Classification Search
CPC ........ F24H 3/087; F24H 3/105; F24H 9/0063; F24H 9/0068
See application file for complete search history.

(56) References Cited

U.S. PATENT DOCUMENTS

| | | | |
|---|---|---|---|
| 1,795,055 A | * | 3/1931 | Taylor .................... F28F 1/126 165/182 |
| 2,053,590 A | * | 9/1936 | Whiteley .................. F24H 1/28 122/45 |

(Continued)

FOREIGN PATENT DOCUMENTS

| | | | |
|---|---|---|---|
| GB | 1142471 A | * | 2/1969 |
| KR | 100257573 B1 | * | 6/2000 |

(Continued)

*Primary Examiner* — Michael G Hoang
*Assistant Examiner* — Logan P Jones
(74) *Attorney, Agent, or Firm* — KED & ASSOCIATES

(57) ABSTRACT

Disclosed are a gas furnace and an air conditioner having the same. The gas furnace includes: a burner for burning fuel; a heat exchanger extending long and providing a passage for combustion gas generated by the burner; a blower for causing a flow of air passing around the heat exchanger; and a plurality of guides passing through the heat exchanger and spaced apart from each other in a longitudinal direction of the heat exchanger. The heat exchanger includes: a first tube forming an entry of the heat exchanger; a second tube forming an exit of the heat exchanger and spaced apart from the first tube in a direction crossing the longitudinal direction of the heat exchanger; and a bend connecting the first tube and the second tube. The plurality of guides is alternately disposed in a direction in which the first tube and the second tube are spaced apart from each other.

15 Claims, 15 Drawing Sheets

(56) References Cited

U.S. PATENT DOCUMENTS

| | | | | | |
|---|---|---|---|---|---|
| 2,289,759 | A | * | 7/1942 | Denise | F24H 3/087 |
| | | | | | 126/110 B |
| 4,648,443 | A | * | 3/1987 | Szucs | F28F 1/30 |
| | | | | | 165/181 |
| 5,548,970 | A | * | 8/1996 | Cunningham, Jr. | F24F 3/1423 |
| | | | | | 62/271 |
| 7,231,963 | B2 | * | 6/2007 | Lee | F28D 15/0275 |
| | | | | | 165/182 |
| 2021/0190373 | A1 | * | 6/2021 | Ouabdenbi | F24D 5/02 |
| 2022/0205683 | A1 | * | 6/2022 | Daniel | F24H 3/08 |
| 2023/0038602 | A1 | * | 2/2023 | Farley | F28D 7/1615 |

FOREIGN PATENT DOCUMENTS

| | | | |
|---|---|---|---|
| KR | 20-2000-0204760 | | 9/2000 |
| KR | 20150144833 A | * | 12/2015 |
| KR | 10-2021-0014518 | | 2/2021 |
| TW | M323585 U | * | 12/2007 |

\* cited by examiner

[FIG. 1]
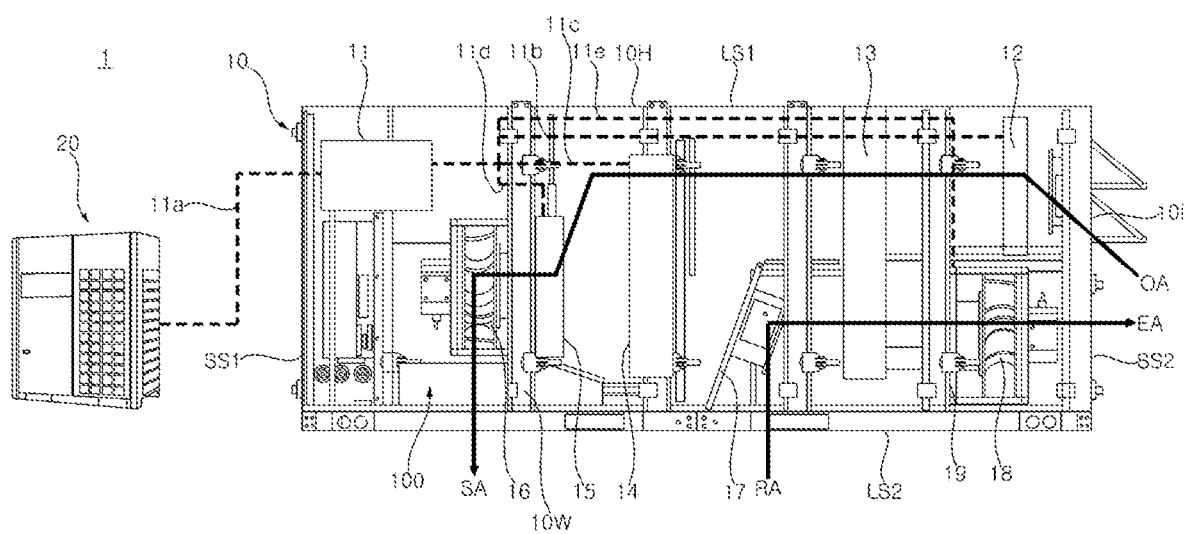

[FIG. 2]
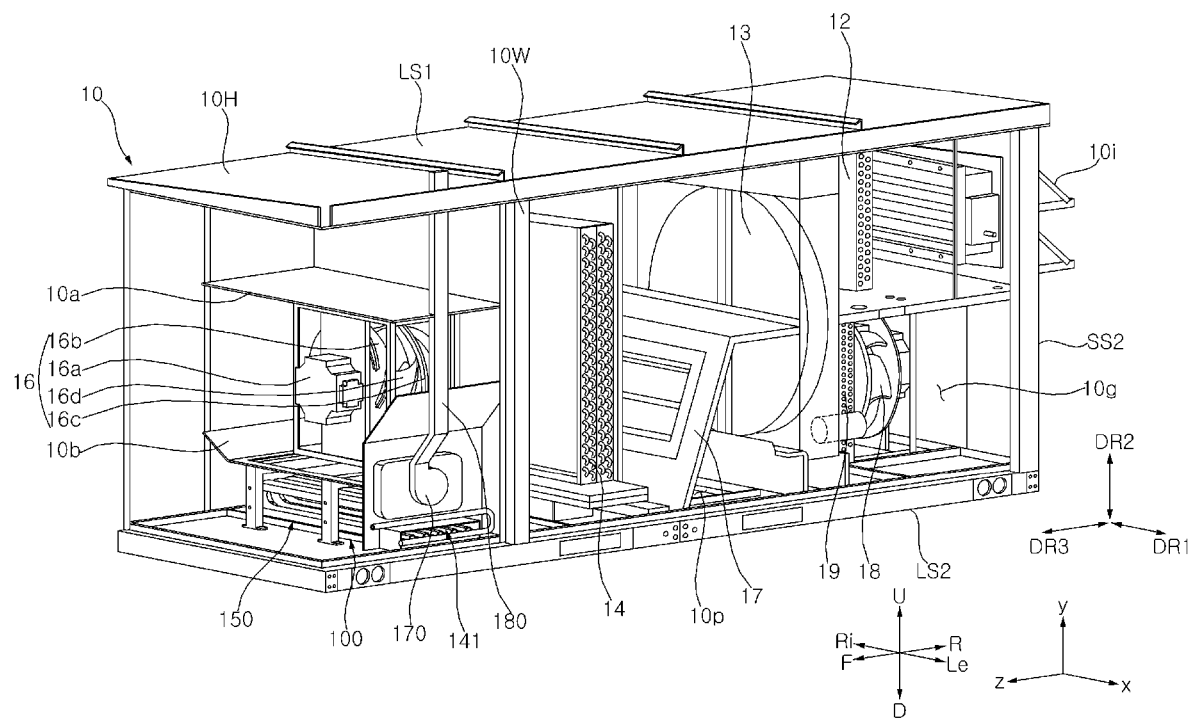

[FIG. 3]
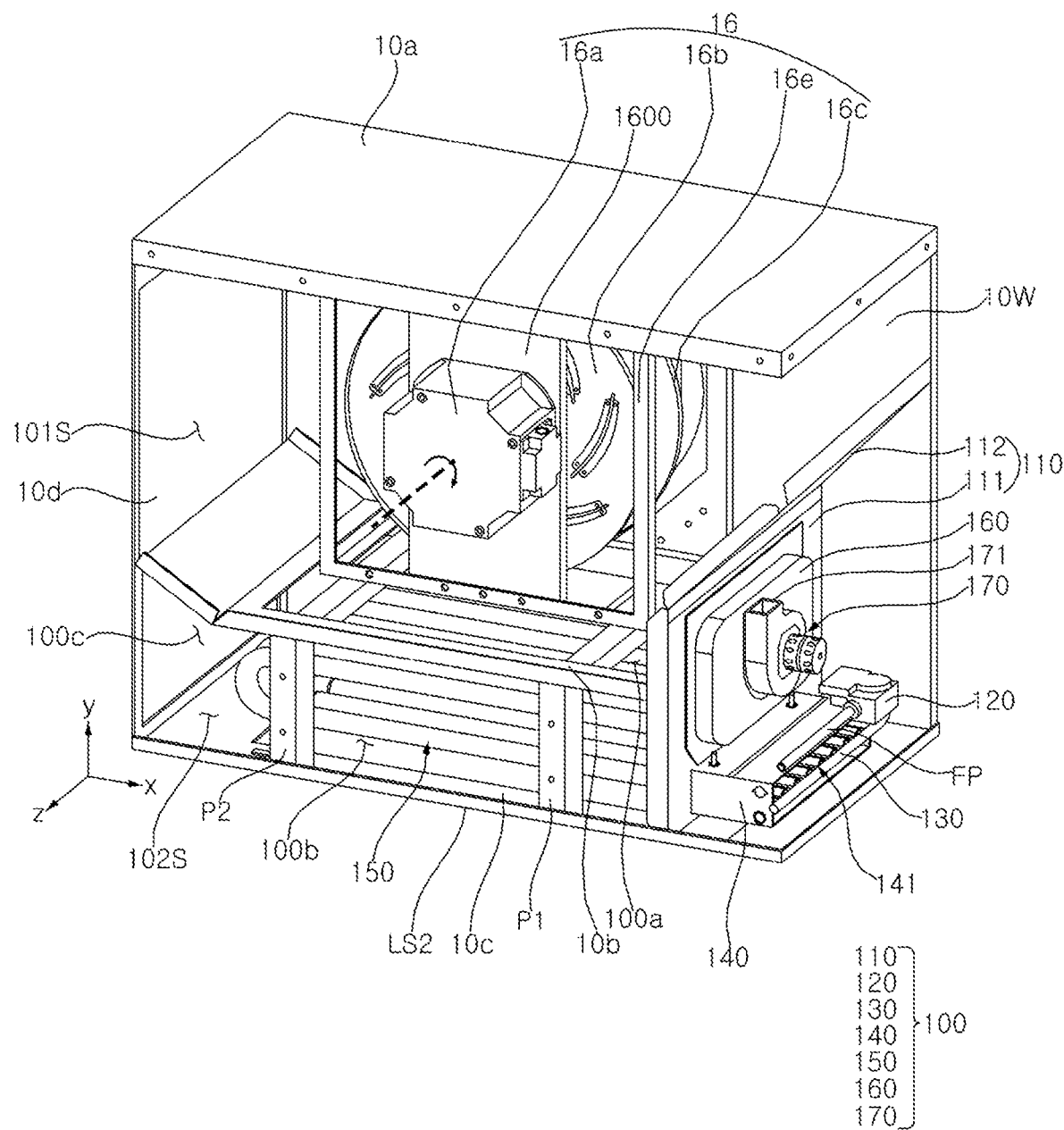

[FIG. 4]
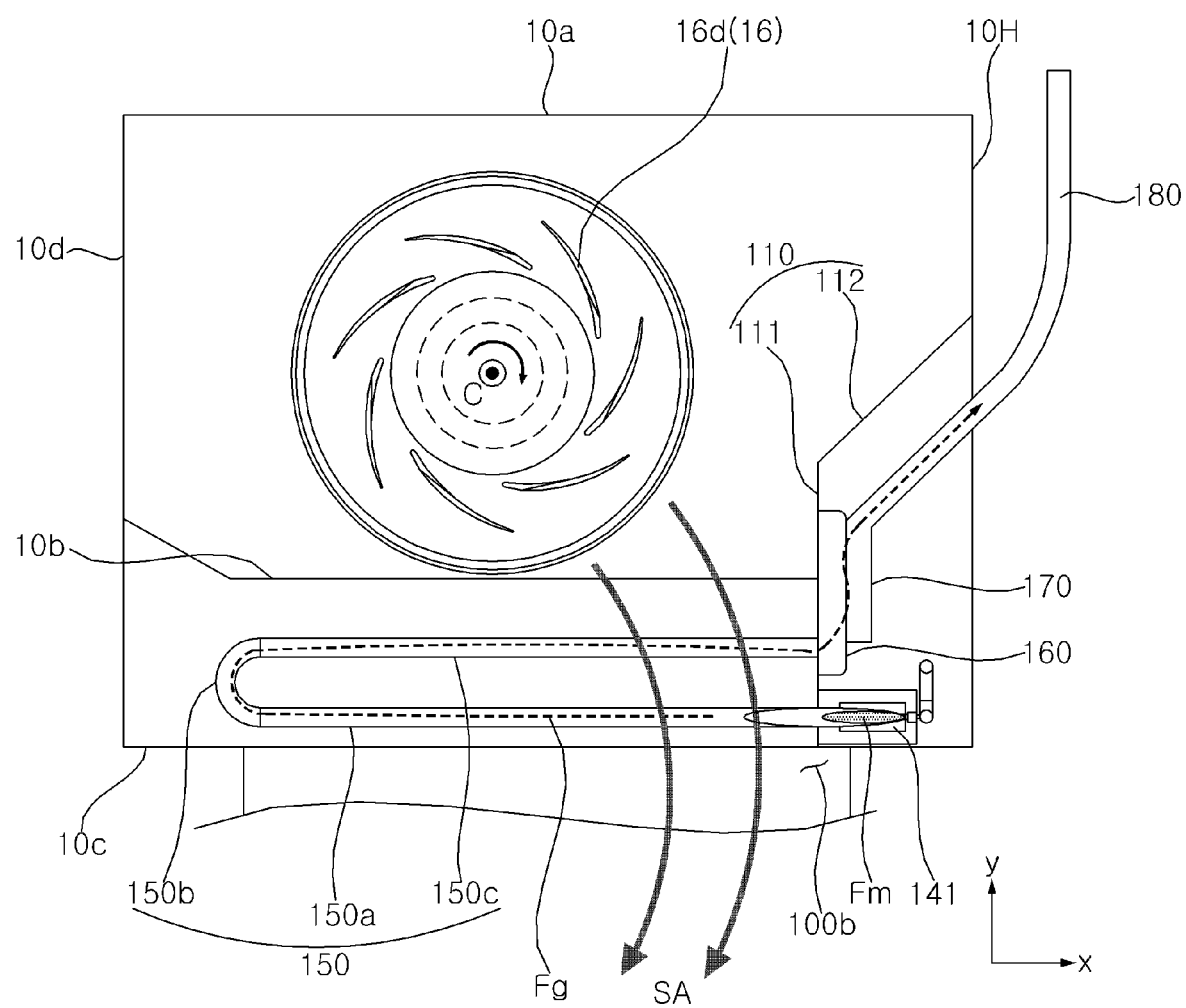

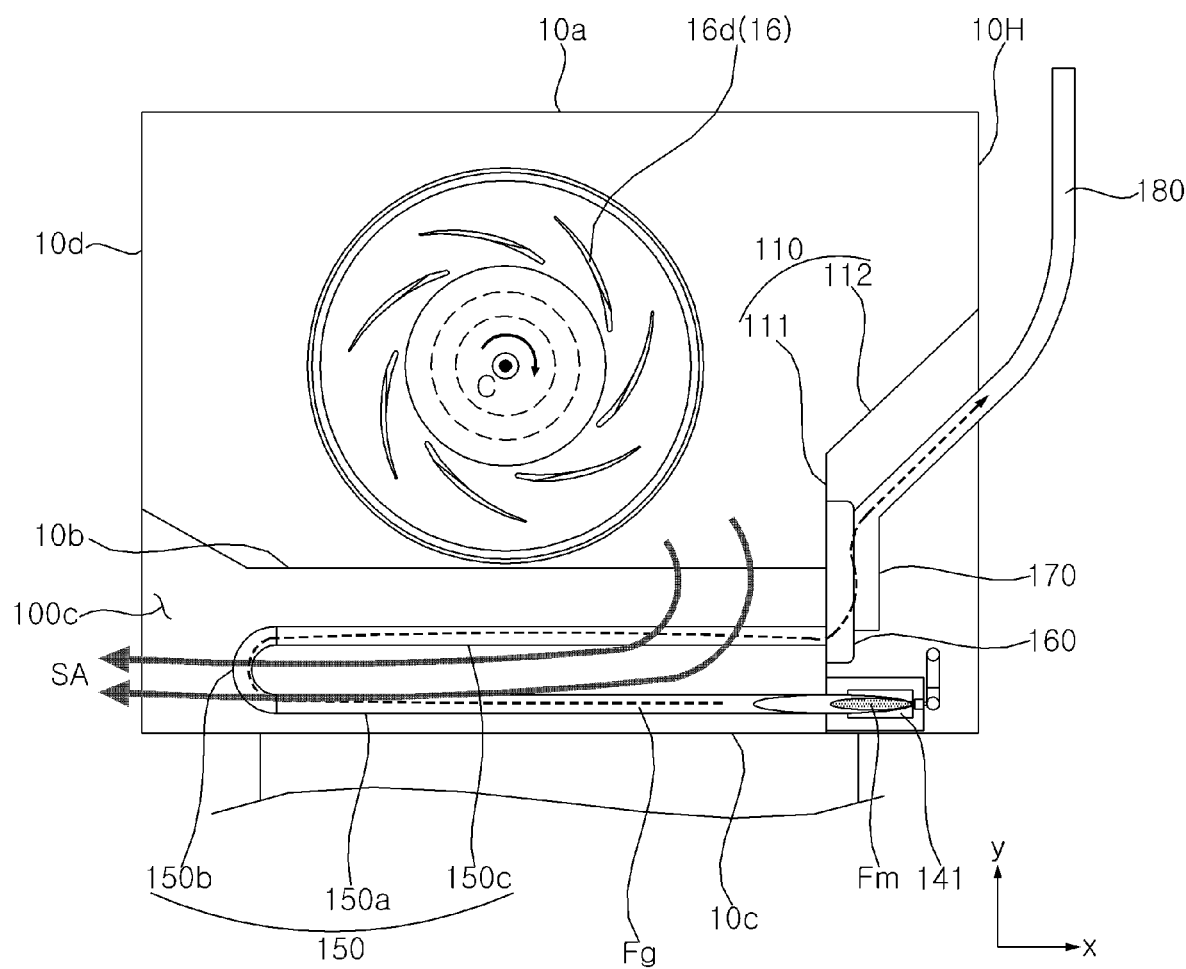
[FIG. 5]

[FIG. 6]
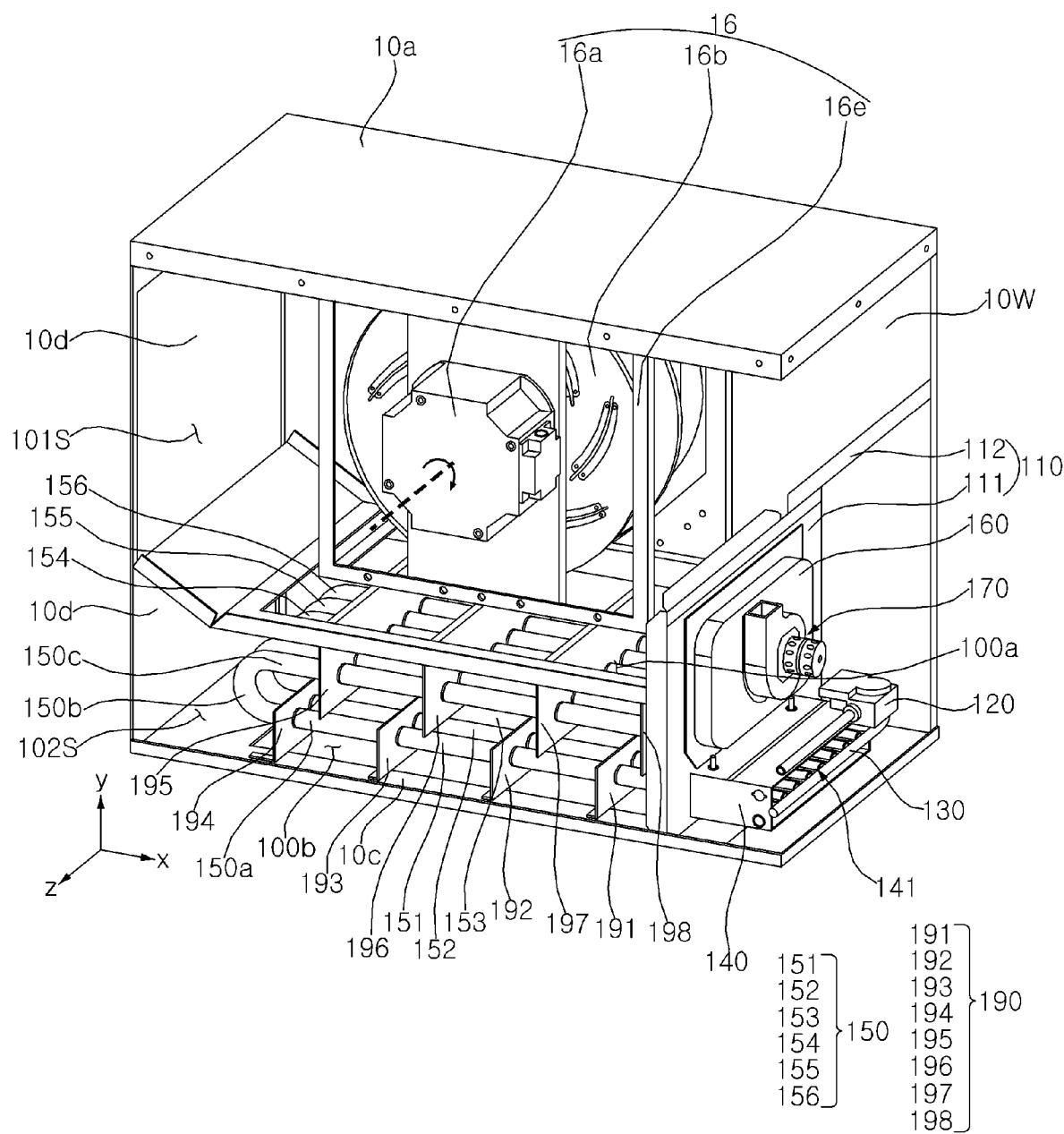

[FIG. 7]
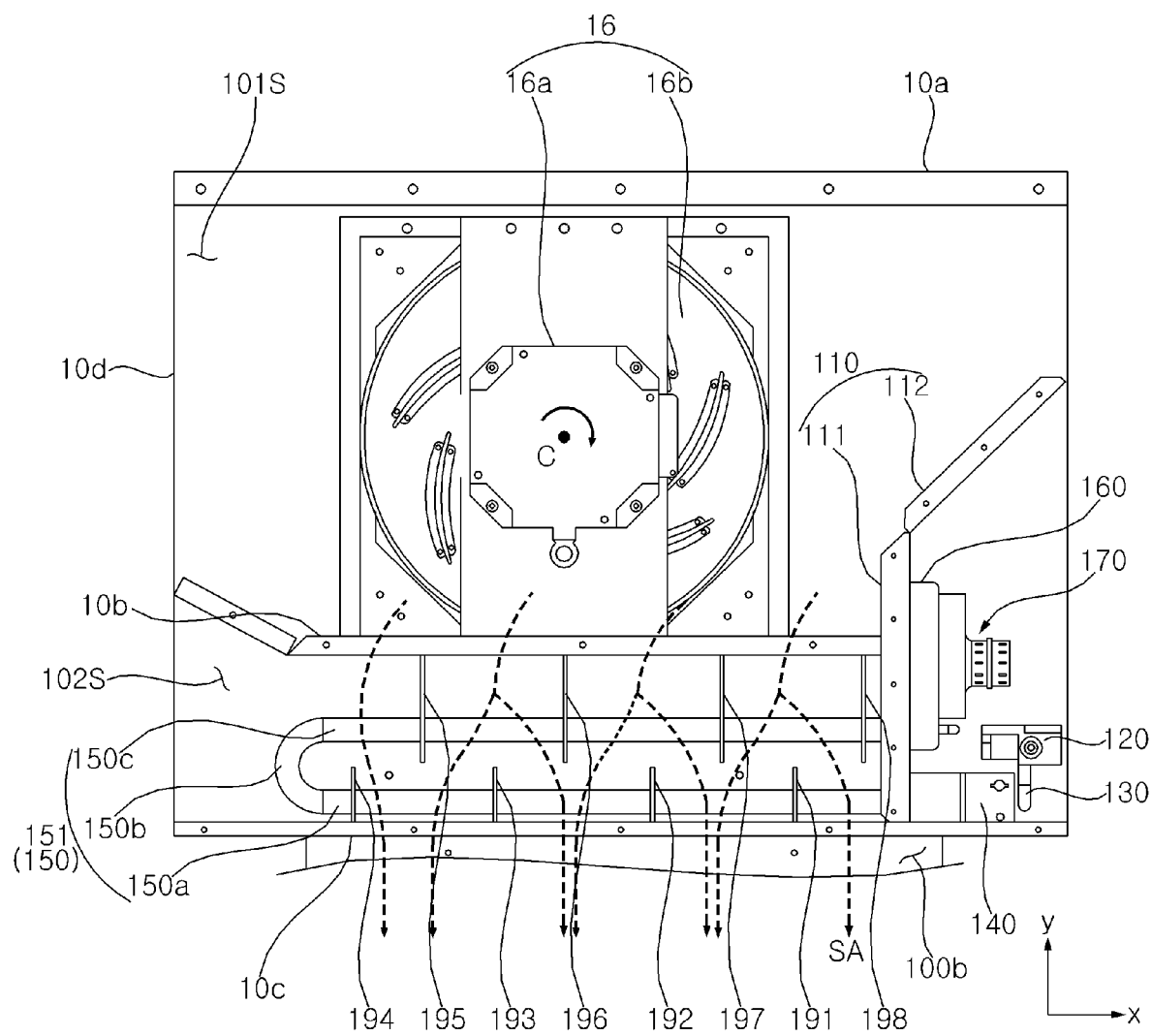

[FIG. 8]
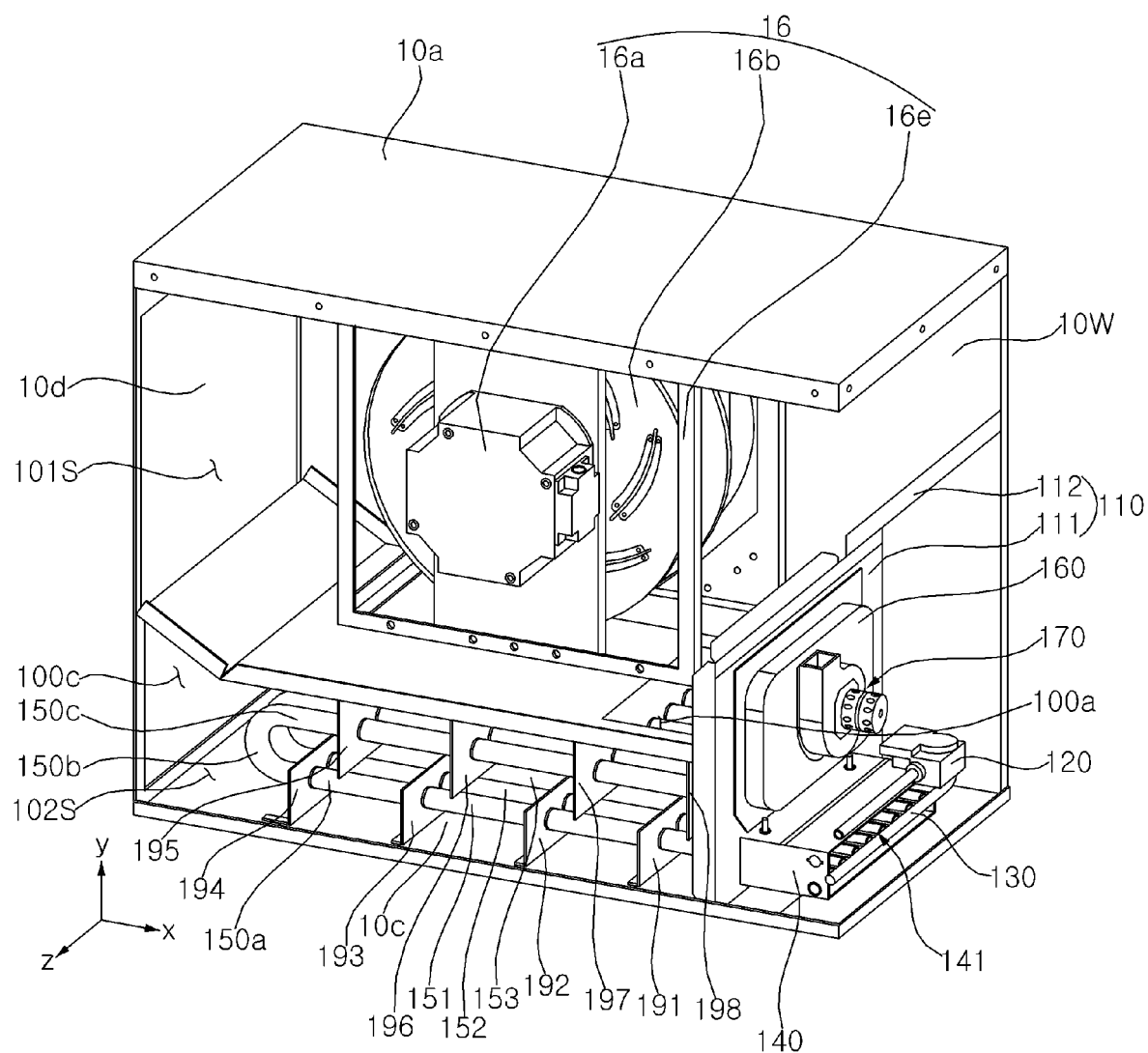

[FIG. 9]
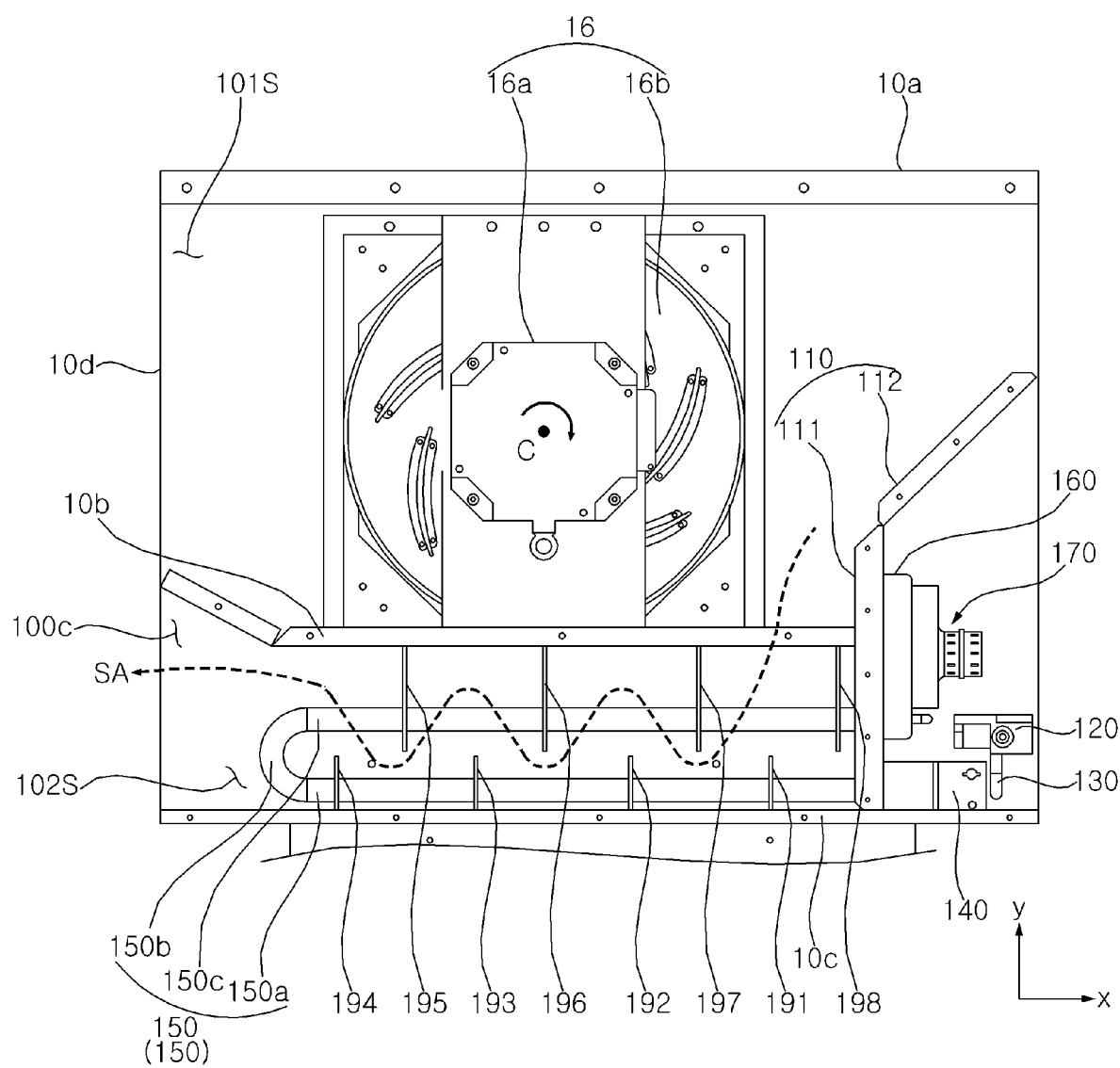

[FIG. 10]
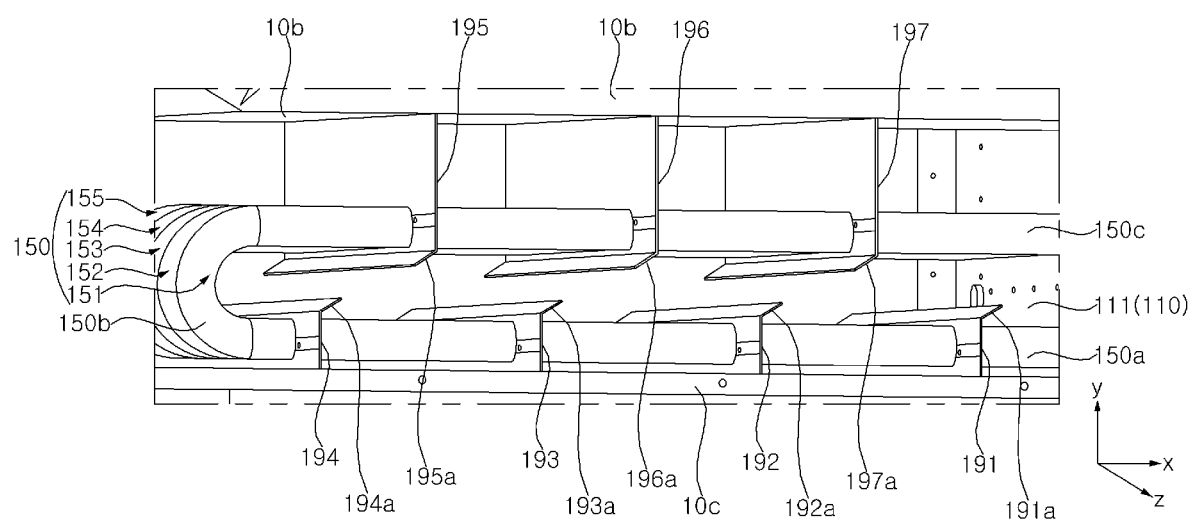

[FIG. 11]
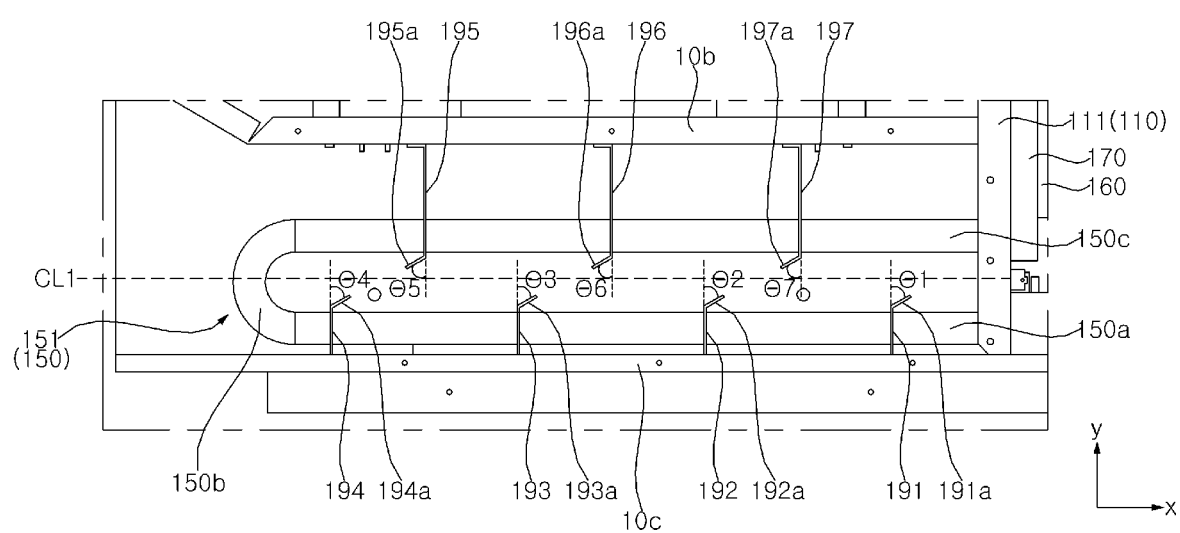

[FIG. 12]
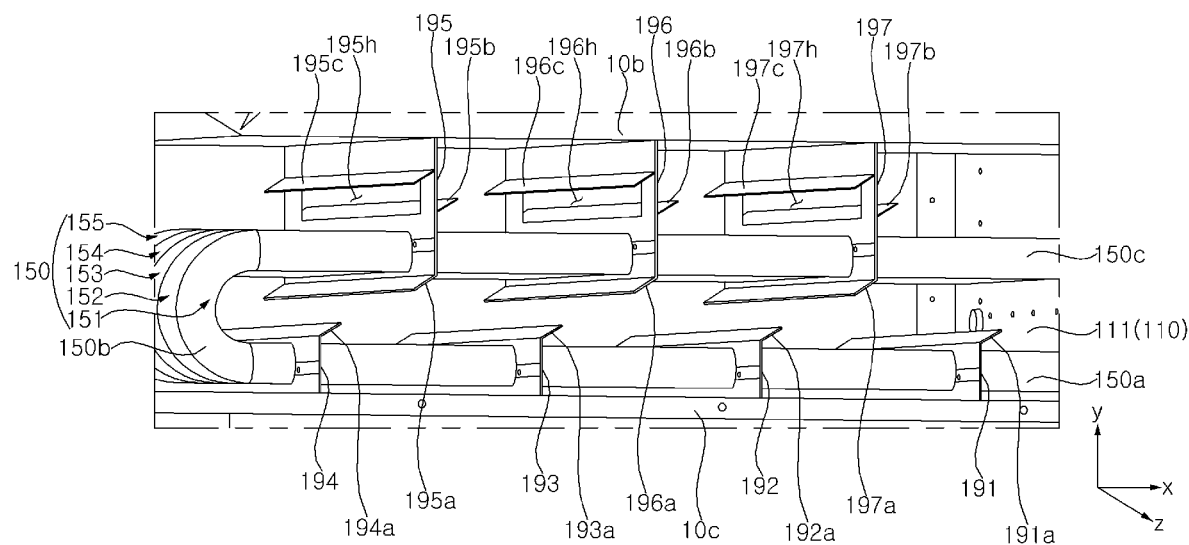

[FIG. 13]
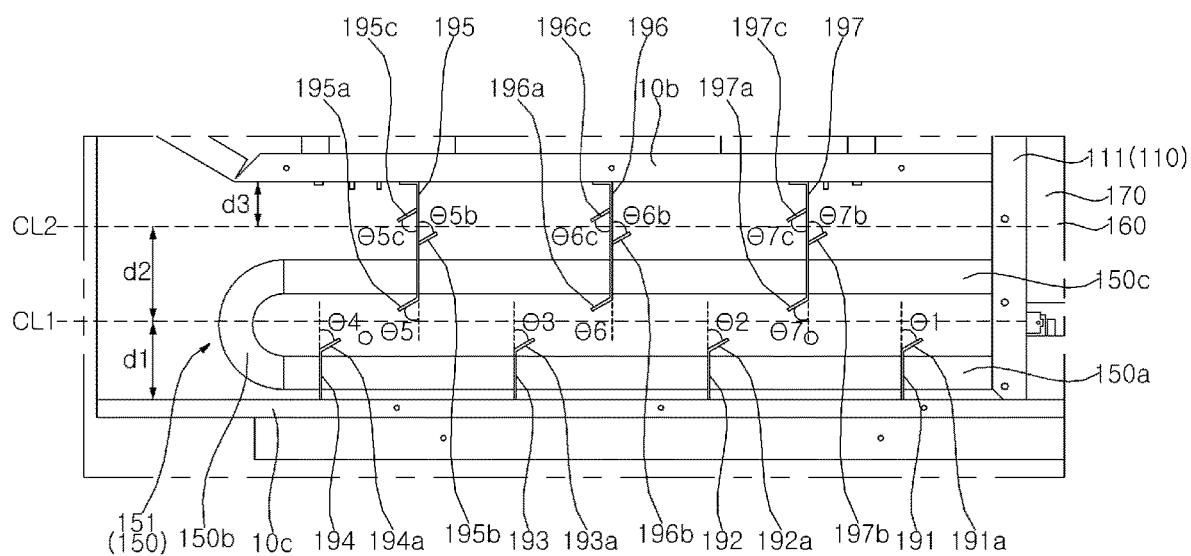

[FIG. 14]
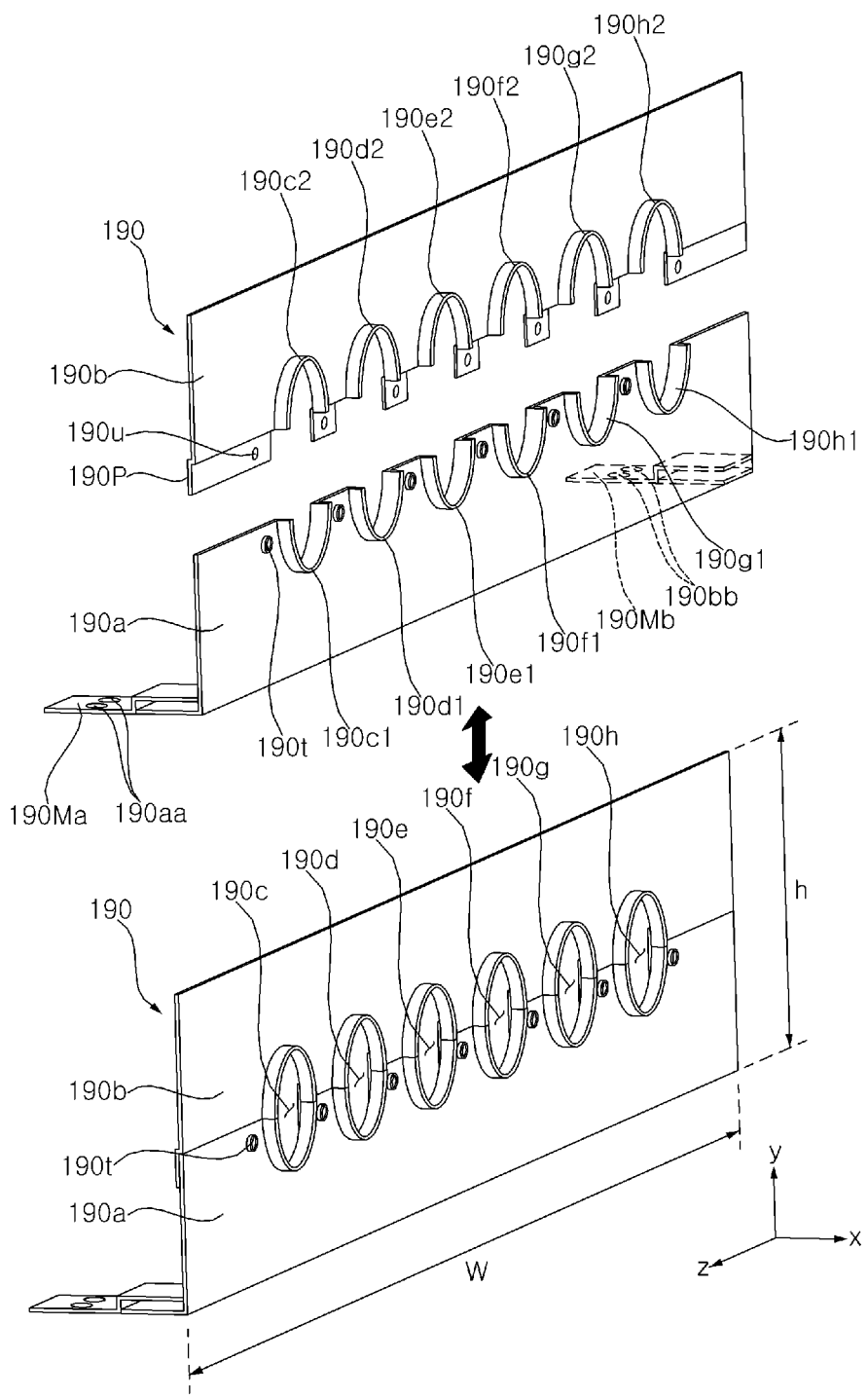

[FIG. 15]
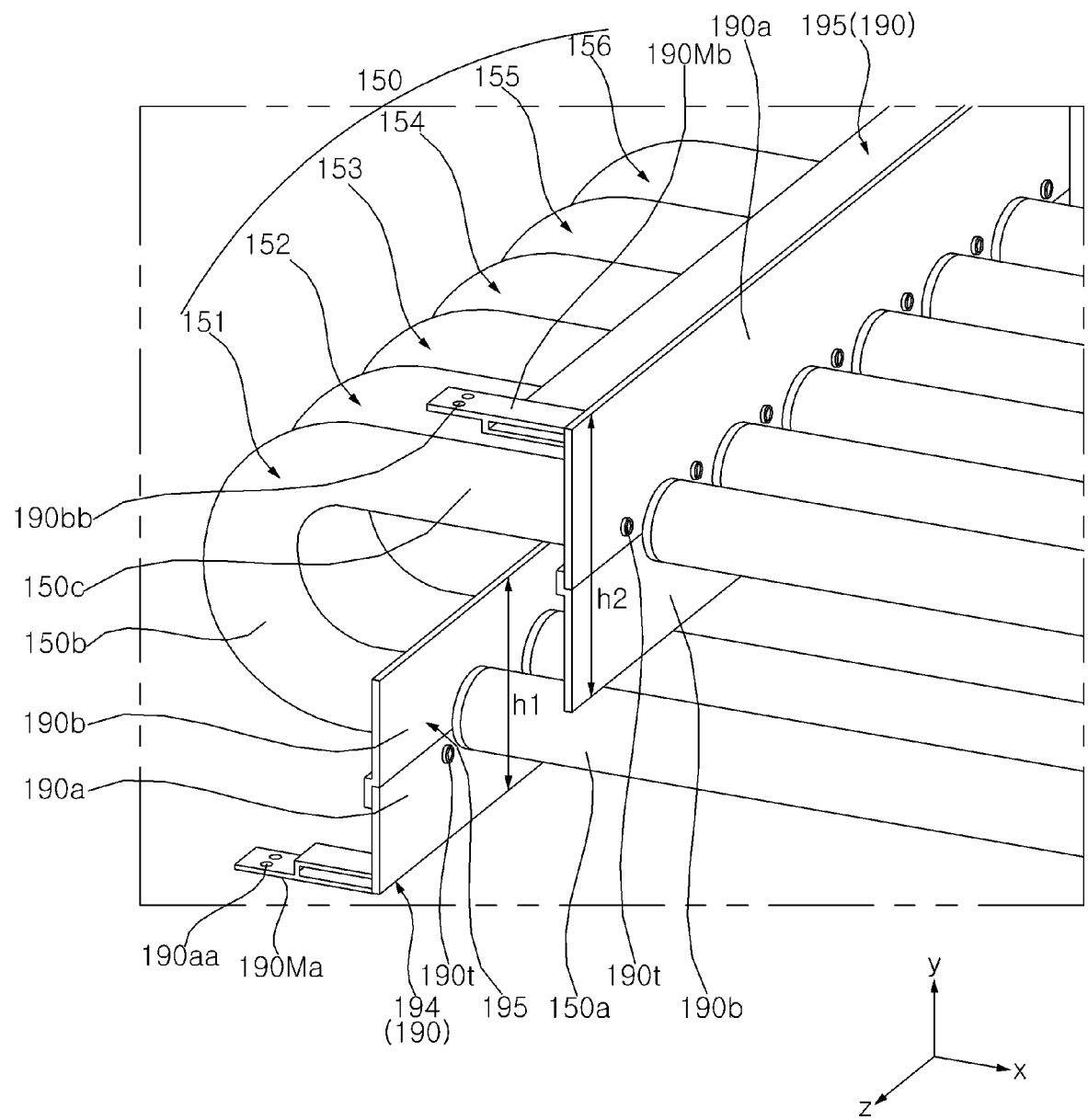

GAS FURNACE AND AIR CONDITIONER HAVING THE SAME

CROSS-REFERENCE TO RELATED PATENT APPLICATIONS

This application claims priority to Korean Patent Application No. 10-2021-0151809, filed Nov. 5, 2021, whose entire disclosures are hereby incorporated by reference.

BACKGROUND OF THE DISCLOSURE

Field of the Disclosure

The present disclosure relates to a gas furnace and an air conditioner having the same.

Related Art

In general, an air conditioner refers to an apparatus for cools and heating an indoor space through compression, condensation, expansion, and evaporation of refrigerant. The air conditioner can improve indoor air quality by exchanging indoor unit with outdoor air through a ventilator. In addition, the ventilator may increase the temperature of air supplied to the indoor space by using high-temperature combustion gas of a gas furnace.

Korean Patent Application Publication No. 2021-0014518 (published on Feb. 9, 2021) discloses a gas furnace having primary and secondary heat exchangers through which combustion gas flows. In this case, the temperature of the air supplied to the indoor space may be increased while the air passes through the primary heat exchanger and the secondary heat exchanger. However, it may be difficult to apply a gas furnace having a secondary heat exchanger to an air conditioner due to a restriction on an installation environment of the air conditioner (for example, in cold regions, a gas furnace having a secondary heat exchange may have problems with condensation or condensation of moisture contained in exhaust gas) or a restriction on an installation space within the air conditioner. In other words, there is a need to improve performance of heat transfer of a gas furnace having only a primary heat exchanger for air.

Korean Patent No. 20-2000-0204760 (registered on Sep. 18, 2000) discloses a water pipe through which water flows, and a burner in which combustion gas passing around the water pipe is generated. In this case, a plurality of baffles is formed in an outer circumferential surface of the water pipe. However, since the baffles are simply arranged in an up-down direction, it is difficult to control the combustion gas passing around the water pipe to flow in a specific direction. That is, the baffles cannot control the flow direction of the combustion gas from the burner to the water pipe. In addition, the baffles are formed with the water pipe integrally (as one body), so there is a problem in that it is difficult to change the shape of the baffle or the water pipe, for example, replacing the existing water pipe and manufacturing a new water pipe having baffles.

SUMMARY OF THE DISCLOSURE

An aspect of the present disclosure is to solve the above and other problems.

Another aspect of the present disclosure provides a gas furnace that guides the flow of air so that the heat transfer performance of the heat exchanger for the air passing around the heat exchanger is improved.

Yet another aspect of the present disclosure provides a gas furnace in which the part of the heat exchanger that is in contact with the air is enlarged.

Yet another aspect of the present disclosure provides a gas furnace in which a time for air to contact the heat exchanger is increased.

Yet another aspect of the present disclosure provides various examples of structures for guiding the flow of air passing through the perimeter of the heat exchanger.

Yet another aspect of the present disclosure provides a structure of a guide detachably coupled to the heat exchanger.

Yet another aspect of the present disclosure provides a structure of a guide capable of integrally fixing a plurality of heat exchangers.

Yet another aspect of the present disclosure provides a plurality of guides compatible with each other.

According to an aspect of the present disclosure, there is provided a gas furnace including: a burner for burning fuel; a heat exchanger extending long and providing a passage for combustion gas generated by the burner; a blower for causing a flow of air passing around the heat exchanger; and a plurality of guides penetrated by the heat exchanger and spaced apart from each other in a longitudinal direction of the heat exchanger.

According to another aspect of the present disclosure, the heat exchanger may include: a first tube forming an entry of the heat exchanger; a second tube forming an exit of the heat exchanger and spaced apart from the first tube in a direction crossing the longitudinal direction of the heat exchanger; and a bend connecting the first tube and the second tube.

According to another aspect of the present disclosure, the plurality of guides may be alternately disposed in a direction in which the first tube and the second tube are spaced apart from each other.

According to another aspect of the present disclosure, the first tube and the second tube may extend in the longitudinal direction of the heat exchanger.

According to another aspect of the present disclosure, the plurality of guides may include: a plurality of lower guides penetrated by the first tube and sequentially arranged along the first tube; and a plurality of upper guides penetrated by the second tube and sequentially arranged along the second tube.

According to another aspect of the present disclosure, the plurality of lower guides may be disposed vertically to the first tube and spaced apart from the second tube.

According to another aspect of the present disclosure, the plurality of upper guides may be disposed vertically to the second tube and spaced apart from the first tube.

According to another aspect of the present disclosure, the gas furnace may further include a top plate positioned between the heat exchanger and the blower, and having a top hole through which air passes; and a bottom plate facing the top plate with respect to the heat exchanger.

According to another aspect of the present disclosure, the gas furnace may further include: a mount plate positioned between the burner and the heat exchanger; and a side plate facing the mount plate with respect to the heat exchanger.

According to another aspect of the present disclosure, the bottom plate may further include a bottom hole formed to penetrate the bottom plate.

According to another aspect of the present disclosure, the top hole and the bottom hole may be formed to extend in a longitudinal direction of the heat exchanger and face each other in a direction in which the first tube and the second tube are spaced apart from each other.

According to another aspect of the present disclosure, the side plate may further include: a side hole formed to penetrate the side plate.

According to another aspect of the present disclosure, the top hole may be positioned to be biased toward the mount plate with respect to the center of the blower.

According to another aspect of the present disclosure, the plurality of upper guides may be positioned above a first reference line extending in the longitudinal direction of the heat exchanger between the first tube and the second tube and intersecting a center of the bend. The plurality of lower guides may be positioned below the first reference line.

According to another aspect of the present disclosure, each of the plurality of upper guides may further include: upper bending portions bent toward the side plate by an acute angle at lower ends of the plurality of upper guides, respectively.

According to another aspect of the present disclosure, each of the plurality of lower guides may further include: lower bending portions bent toward the mount plate by an acute angle at upper ends of the plurality of lower guides, respectively.

According to another aspect of the present disclosure, the upper bending portion may be adjacent to the lower bending portions in bending directions of the upper bending portions with respect to the plurality of upper guides, respectively.

According to another aspect of the present disclosure, the second reference line may extend along a longitudinal direction of the heat exchanger between the second tube and the top plate, and may be located below the top plate.

According to another aspect of the present disclosure, a distance between the second reference line and the first reference line may be equal to a distance between the first reference line and the bottom plate.

According to another aspect of the present disclosure, the plurality of upper guides may respectively further include: openings formed to pass through the plurality of upper guides and aligned with the second reference line.

According to another aspect of the present disclosure, the mount plate may be located to the left of the heat exchanger.

According to another aspect of the present disclosure, the plurality of upper guides may further include: left protrusions obliquely protruding obliquely leftward of the openings from lower ends of the openings; and right protrusions protruding obliquely rightward of the openings from upper ends of the openings.

According to another aspect of the present disclosure, the longitudinal direction of the heat exchanger may be defined as a first direction, the direction in which the first tube and the second tube are spaced apart from each other may be defined as a second direction, and a direction orthogonal to the first direction and the second direction may be defined as a third direction. The heat exchanger may further include: a plurality of heat exchangers spaced apart from each other in the third direction.

According to another aspect of the present disclosure, each of the plurality of lower guides may extend in the third direction, and may be penetrated by a plurality of first tubes of the plurality of heat exchangers.

According to another aspect of the present disclosure, each of the plurality of upper guides may extend in the third direction, and a plurality of second tubes of the plurality of heat exchangers may pass therethrough.

According to another aspect of the present disclosure, each of the plurality of lower guides may further include: a first part; and a second part detachably coupled to the first part in the second direction.

According to another aspect of the present disclosure, the plurality of first tubes may passes through a plurality of through-holes formed between the first part and the second part.

According to another aspect of the present disclosure, the plurality of through holes may be formed between a plurality of lower grooves of the first part and a plurality of upper grooves of the second part.

According to another aspect of the present disclosure, the first part may further include: a plurality of lower ribs respectively protruding in the first direction from the plurality of lower grooves and respectively extending along the plurality of lower grooves.

According to another aspect of the present disclosure, the second part comprises: a plurality of upper ribs respectively protruding in the first direction from the plurality of upper grooves and respectively extending along the plurality of upper grooves.

According to another aspect of the present disclosure, the second part may further include a stepped portion protruding from one end of the second part facing the first part and being stepped with respect to the second part.

According to another aspect of the present disclosure, the one end of the second part may be seated on one end of the first part facing the second part.

According to another aspect of the present disclosure, the stepped portion may be detachably coupled to the first part.

According to another aspect of the present disclosure, the first part may further include: a pair of legs extending from the first part in the second direction and spaced apart from each other in the third direction.

According to another aspect of the present disclosure, at least one of a plurality of upper guides may be compatible with at least one of the plurality of lower guides.

According to another aspect of the present disclosure, there may be provided an air conditioner having an outdoor unit and a ventilator that are connected to each other through a refrigerant pipe. The ventilator may include: an air supply fan for causing a flow of air along an air supply passage; an exhaust fan for causing a flow of air along an exhaust passage separated from the air supply passage; a plurality of coils located in the air supply passage and having refrigerant flowing therethrough; and a gas furnace positioned downstream of the plurality of coils in the air supply passage.

The gas furnace and the air conditioner having the same according to the present disclosure may have effects as below.

According to at least one of the embodiments of the present disclosure, a plurality of guides may be penetrated by a heat exchanger and may guide air passing through the heat exchanger. That is, a gas furnace capable of improving the heat exchanger's performance of heat transfer with the air passing around the heat exchanger may be provided.

According to at least one of the embodiments of the present disclosure, an area of the heat exchanger in contact with air may be increased due to the plurality of guides that are alternately arranged. That is, a gas furnace capable of improving the heat exchanger's performance of heat transfer with the air passing around the heat exchanger may be provided.

According to at least one of the embodiments of the present disclosure, a time for air to contact the heat exchanger may be increased due to the plurality of guides that are alternately disposed with each other. That is, a gas furnace capable of improving the heat exchanger's performance of heat transfer with the air passing around the heat exchanger may be provided.

According to at least one of the embodiments of the present disclosure, various examples of a structure for guiding a flow of air passing around the heat exchanger may be provided.

According to at least one of the embodiments of the present disclosure, air may smoothly flow between alternately arranged guides through bending portions of the guides.

According to at least one of the embodiments of the present disclosure, it is possible to minimize a vortex of air or a flow loss of air formed adjacent to the guides through openings of the guides.

According to at least one of the embodiments of the present disclosure, a guide may include a first part and a second part, which are detachably coupled to each other. That is, it is possible to provide a structure of a guide detachably coupled to a heat exchanger.

According to at least one of the embodiments of the present disclosure, a plurality of heat exchangers may penetrate between a first part and a second part of a guide. That is, it is possible to provide a structure of a guide capable of integrally fixing a plurality of heat exchangers.

According to at least one of the embodiments of the present disclosure, at least one of lower guides detachably coupled to a first tube of a heat exchanger may be compatible with at least one of upper guides detachably coupled to a second tube of the heat exchanger. That is, a plurality of guides compatible with each other may be provided.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIGS. 1 and 2 are views showing a durable configuration of an air conditioner according to an embodiment of the present disclosure.

FIG. 3 is a view showing a gas furnace according to an embodiment of the present disclosure.

FIG. 4 is an example in which air discharged from a blower flows from top to bottom of a heat exchanger.

FIG. 5 shows an example in which air discharged from the blower flowing sideways from the top of the heat exchanger.

FIG. 6 is a view showing a gas furnace according to an embodiment of the present disclosure.

FIG. 7 shows guides for dispersing air flowing from top to bottom of a heat exchanger to the left and right side of the heat exchanger.

FIG. 8 is a view showing a gas furnace according to an embodiment of the present disclosure.

FIG. 9 shows guides for causing air, flowing from the top to the side of the heat exchanger, to flow upward in a zigzag fashion.

FIGS. 10 and 11 show guides having lower bending portions and upper bending portions.

FIGS. 12 and 13 show guides with openings.

FIGS. 14 and 15 show guides detachably coupled to a heat exchanger and interchangeable with each other.

DESCRIPTION OF EXEMPLARY EMBODIMENTS

Hereinafter, the embodiments disclosed in the present specification will be described in detail with reference to the accompanying drawings, but the same or similar components are assigned the same reference numerals regardless of reference numerals, and redundant description thereof will be omitted.

The suffixes "module" and "part" for components used in the following description are given or mixed in consideration of only the ease of writing the specification, and do not have distinct meanings or roles by themselves.

In addition, in describing the embodiments disclosed in the present specification, if it is determined that detailed descriptions of related known technologies may obscure the gist of the embodiments disclosed in this specification, the detailed description thereof will be omitted. In addition, the accompanying drawings are only for easy understanding of the embodiments disclosed in the present specification, and the technical spirit disclosed in the present specification is not limited by the accompanying drawings, and all changes included in the spirit and scope of the present disclosure, should be understood to include equivalents or substitutes.

Terms including ordinal numbers such as first, second, etc. may be used to describe various elements, but the elements are not limited by the terms. The above terms are used only for the purpose of distinguishing one component from another.

When a component is referred to as being "connected" or "connected" to another component, it may be directly connected or connected to the other component, but it is understood that other components may exist in between. On the other hand, when it is said that a certain component is "directly connected" or "directly connected" to another component, it should be understood that the other component does not exist in the middle.

A singular expression includes a plural expression unless the context clearly dictates otherwise.

In the following description, even if an embodiment is described with reference to specific figure, a reference numeral not indicated in the specific figure may be referred to if necessary, and the reference numeral not indicated in the specific figure may be used when indicated in the other figure.

The directions of upward (U, y), downward (D), leftward (Le, x), rightward (Ri), forward (F, z), and rear direction (R) indicated in FIG. 2 are used for convenience of explanation, and the technical spirit of the present disclosure is not limited thereby.

Referring to FIGS. 1 and 2, an air conditioner 1 may include an outdoor unit 20 and a ventilator 10. The outdoor unit 20 may include a compressor (not shown) for compressing refrigerant and an outdoor heat exchanger (not shown) for performing heat exchange between refrigerant and outdoor air. The outdoor unit 20 may be connected to the ventilator 10 through a refrigerant pipe 11*a*. The refrigerant may circulate the outdoor unit 20 and the ventilator 10 through the refrigerant pipe. A housing 10H of the ventilator 10 may form the exterior of the ventilator 10.

The housing 10H may include a first long side LS1 and a second long side LS2 opposite to the first long side LS1. The first long side LS1 and the second long side LS2 may be collectively referred to as a long side LS1 and LS2. The housing 10H may include a first short side SS1 adjacent to the long side LS1 and LS2 and a second short side SS2 opposite the first short side SS1. The first short side SS1 and the second short side SS2 may be collectively referred to as a short side SS1 and SS2.

A direction vertically to the long side LS1 and LS2 and the short side SS1 and SS2 may be referred to as a first direction DR1 or a left-right direction. A direction parallel to the short side SS1 and SS2 may be referred to as a second direction DR2 or an up-down direction. A direction parallel to the long side LS1 and LS2 may be referred to as a third direction DR3 or a front-rear direction.

A side of the first long side LS1 may be referred to as an upper side (U, y), and a side of the second long side LS2 may be referred to as a lower side (D). A side of the first short side SS1 may be referred to as a front side (F, z), and a side of the second short side SS2 may be referred to as a rear side (R). In the first direction DR1, a direction toward one end of the short side SS1 and SS2 may be referred to as a left side (Le, x), and a direction toward the other end of the short side SS1 and SS2 may be referred to as a right side (Ri).

The ventilator 10 may include a refrigerant distributor 11, a plurality of heat exchangers 12, 13, 14, 15, and 19, a blower 16, a partition 17, and an exhaust fan 18. The refrigerant distributor 11, the plurality of heat exchangers 12, 13, 14, 15, and 19, the blower 16, the partition 17, and the exhaust fan 18 may be installed inside the housing 10H.

An air supply passage OA-SA may be formed between a first inlet 10i and a first outlet (not shown). The first inlet 10i may be formed to penetrate the second short side SS2 and may be adjacent to the first long side LS1. The first outlet may be formed to penetrate the second long side LS2 and may be adjacent to the first short side SS1. Outdoor air OA may be introduced into the first inlet 10i, and the first inlet 10i may be referred to as an outdoor air inlet. Supply air SA may be supplied into a room through the first outlet, and the first outlet may be referred to as a supply air outlet.

The blower 16 may be adjacent to the first outlet and located in the air supply passage OA-SA. The blower 16 may cause a flow of air along the air supply passage OA-SA. The blower 16 may be referred to as an air supply fan or a plug fan. Meanwhile, an air supply duct (not shown) may be connected to the second long side LS2 and may communicate with the first outlet and the indoor space. For example, the air volume per minute of the blower 16 may be 3,000 to 5,000 cubic feet per minute (CFM).

The exhaust passage RA-EA may be formed between the second inlet 10p and the second outlet 10g. The second inlet 10p may be formed to penetrate the second long side LS2 and may be spaced apart from the first outlet. The second outlet 10g may be formed through the second short side SS2 and may be adjacent to the second long side LS2. The bet (RA, room air, or return air) may be introduced into the second inlet 10p, and the second inlet 10p may be referred to as a bet inlet. Exhaust air (EA) may be discharged to the outside through the second outlet 10g, and the second outlet 10g may be referred to as an exhaust outlet.

The exhaust fan 18 may be located in the exhaust passage RA-EA adjacent to the second discharge port 10g. The exhaust fan 18 may cause a flow of air along the exhaust passage RA-EA. The exhaust fan 18 may be referred to as a blower or a plug fan. On the other hand, the inner duct (not shown) may be connected to the second long side (LS2), it may be in communication with the second inlet (10p) and the indoor space.

The partition wall 17 may divide the inner space of the housing 10H into a space in which the air supply passage OA-SA is formed and a space in which the exhaust passage RA-SA is formed. The partition wall 17 may be installed near the second inlet 10p of the housing 10H, and may include an inclined portion (unsigned) and a horizontal portion (unsigned). Accordingly, the air supply passage OA-SA may be located above the partition wall 17, and the exhaust passage RA-SA may be located below the partition wall 17.

The refrigerant distributor 11 may be adjacent to the first long side LS1 and the first short side SS1. One side of the refrigerant distributor 11 may be connected to the refrigerant pipe (11a). The other side of the refrigerant distributor 11 may be connected to a plurality of pipes 11b, 11c, 11d, and 11e. For example, the refrigerant distributor 11 may open and close the passage of each pipe through a solenoid valve. Here, each pipe 11b, 11c, 11d, or 11e may include a refrigerant pipe providing a passage of refrigerant supplied to each heat exchanger 12, 14, 15, or 19, and a refrigerant pipe providing a passage of refrigerant passing through each heat exchanger 12, 14, 15, or 19. In addition, each expansion valve (not shown) may expand the refrigerant flowing through each of the pipes 11b, 11c, 11d, and 11e. For example, the expansion valve may be an Electronic Expansion Valve (EEV) capable of adjusting the opening degree. In this case, when the expansion valve is fully opened, the expansion valve may not expand the refrigerant.

The preheater 12 may be located in the air supply passage OA-SA adjacent to the first inlet 10i. A preheater 12 may be disposed vertically within the housing 10H. A first pipe 11b may provide a refrigerant passage connecting the refrigerant distributor 11 and the preheater 12. Accordingly, the preheater 12 may heat air introduced into the first inlet 10i. The preheater 12 may be referred to as a preheat coil.

The heat exchanger 14 may be located downstream of the preheater 12 in the air supply passage OA-SA. The heat exchanger 14 may be vertically disposed within the housing 10H. A size of the heat exchanger 14 may be larger than a size of the preheater 12. The second pipe 11c may provide a refrigerant passage connecting the refrigerant distributor 11 and the heat exchanger 14. The heat exchanger 14 may be referred to as a main heat exchanger or a cooling/heating coil.

A reheater 15 may be located downstream of the heat exchanger 14 in the air supply passage OA-SA. The reheater 15 may be vertically disposed within the housing 10H. A size of the reheater 15 may be smaller than a size of the heat exchanger 14. The third pipe 11d may provide a refrigerant passage connecting the refrigerant distributor 11 and the reheater 15. The reheater 15 may be referred to as a reheat coil. Meanwhile, the reheater 15 may be operated based on a set indoor temperature and a set humidity. The reheater 15 may face the blower 16 with respect to a base 10W on which the reheater 15 is installed.

A recovery coil 19 may be located in an exhaust passage RA-EA adjacent to the exhaust fan 18. The recovery coil 19 may be vertically disposed within the housing 10H. A fourth pipe 11e may provide a refrigerant passage connecting the refrigerant distributor 11 and the recovery coil 19. Meanwhile, a heat transfer direction of the recovery coil 19 to air may be opposite to a heat transfer direction of the heat exchanger 14 to air.

A part of the recovery wheel 13 may be located in the air supply passage OA-SA between the preheater 12 and the heat exchanger 14, and the other part of the recovery wheel 13 may be located in the exhaust passage RA-EA between the recovery coil 19 and the inclined portion of the partition wall 17. The recovery wheel 13 may be referred to as an energy recovery wheel (ERW).

In this case, the recovery wheel 13 may have a flat cylinder shape as a whole. A honeycomb structure may be formed inside the recovery wheel 13, and air may pass through the honeycomb structure. The recovery wheel 13 may be rotated at a low speed. Accordingly, the recovery wheel 13 may recover sensible heat and latent heat by using temperature difference and humidity difference between the outdoor air OA and the indoor air RA.

Referring to FIGS. 2 and 3, the blower 16 may include a motor 16a, a hub 16b, a shroud 16c, and a plurality of blades 16d. The hub 16b, the shroud 16c, and the plurality of blades 16d may be collectively referred to as an impeller 16a, 16b, and 16c.

The motor 16a may provide a rotational force. The motor 16a may be a centrifugal fan motor. The motor 16a may form a front end of the blower 16, and a rotational shaft of the motor 16a may extend rearward from the motor 16a. A longitudinal direction of the rotational shaft of the motor 16a may be referred to as an axial direction of the blower 16.

The hub 16b may be located at the rear of the motor 16a and may be fixed to the rotational shaft of the motor 16a. The hub 16b may have a disk shape.

The shroud 16c may be located at the rear of the hub 16b and may have a ring plate shape. The shroud 16c may be rotatably coupled to the base 10W. For example, an inlet (unsigned) may be fixed to a front surface of the base 10W between the shroud 16c and the base 10W, and may have a hyperbolic cylinder or funnel shape. In this case, the shroud 16c may be rotatably coupled to the inlet. A hole formed inside the shroud 16c, an inner space of the inlet, and a hole (not shown) formed in the base 10W may communicate with one another and be located in the air supply passage OA-SA (see FIG. 1).

The plurality of blades 16d may be located between an inner periphery and an outer periphery of the ring-shaped shroud 16c. The plurality of blades 16d may be coupled to the hub 16b and the shroud 16c between the hub 16b and the shroud 16c. The plurality of blades 16d may be formed integrally with the shroud 16c and the hub 16b.

In addition, the plurality of blades 16d may be spaced apart from each other in a rotating direction of the rotational shaft of the motor 16a. Each of the plurality of blades 16d may be convexly curved in the rotating direction of the rotational shaft (see FIGS. 4 and 5). Among the plurality of blades 16d, a blade positioned close to a mount plate 110 to be described later may be convex toward the mount plate 110.

Accordingly, when the impeller 16a, 16b, and 16c is rotated in a clockwise direction in response to driving of the motor 16a, air may be introduced in an axial direction of the blower 16 through a hole of the base 10W and may be pressed by the plurality of blades 16d to be discharged in a radial direction of the blower 16. In this case, a flow of air discharged by the blower 16 may be concentrated on the left side of the blower 16 rather than the right side of the blower 16.

A horizontal plate 10a may be vertically disposed on a front surface of the base 10W, and may be coupled to the front surface of the base 10W. The horizontal plate 10a may be located above the blower 16. The horizontal plate 10a may be referred to as a first horizontal wall or a first panel. Meanwhile, a frame 16e may form a skeleton of the blower 16, and a motor mount 1600 on which the motor 16a is mounted may be coupled to the frame 16a. The frame 16e may be coupled to the bottom of the horizontal plate 10a.

A top plate 10b may be disposed vertically to the front surface of the base 10W, and may be coupled to the front surface of the base 10W. The top plate 10b may be located below of the blower 16. The top plate 10b may be referred to as a second horizontal wall or a second panel. A top hole 100a may be formed to penetrate the top plate 10b in the up-down direction. The top hole 100a may be formed to be long in the left-right direction. In the up-down direction, at least a portion of the top hole 100a may overlap the blower 16.

A bottom plate 10c may be disposed vertically to the front surface of the base W, and may be coupled to the front surface of the base 10W. The bottom plate 10c may face the horizontal plate 10a with respect to the top plate 10b. The bottom plate 10c may form a part of the second long side LS2 of the housing 10H. The bottom hole 100b may be formed to penetrate the bottom plate 10c in the up-down direction. The bottom hole 100b may be formed to be long in the left-right direction. In the up-down direction, the bottom hole 100b may face the top hole 100a.

The side plate 10d may be disposed vertically to the front surface of the base W, and may be coupled to the front surface of the base W. The side plate 10d may be coupled to a right side of the horizontal plate 10a, a right side of the top plate 10b, and a right side of the bottom plate 10c. A side hole 100c may be formed to penetrate the side plate 10d in the left-right direction. The side hole 100c may be formed to be long in the front-rear direction. The side hole 100c may be located between a right side of the top plate 10b and a right side of the bottom plate 10c.

The mount plate 110 may include a first plate 111 and a second plate 112. The first plate 111 may be vertically disposed on the front surface of the base W and an upper surface of the bottom plate 10c, and may be coupled to the front surface of the base W and the upper surface of the bottom plate 10c. The first plate 111 may be coupled to a left side of the top plate 10b. The second plate 112 may extend obliquely in a direction away from the blower 16 from an upper end of the first plate 111. In this case, a left side of the base 10W, a left side of the horizontal plate 10a, a left side of the second plate 112, and a left side of the bottom plate 10c may be connected to a left side of the housing 10H.

A first space 101S may be formed between the horizontal plate 10a and the top plate 10b. A vertical plate (not shown) may be connected to a front end of the horizontal plate 10a and a front end of the top plate 10b, and may close a front side of the first space 101S. The first space 101S may communicate with the top hole 100a.

A second space 102S may be formed between the top plate 10b and the bottom plate 10c. The vertical plate may be connected to a front end of the top plate 10b and a front end of the bottom plate 10c, and may close the front side of the second space 102S. The second space 102S may communicate with the bottom hole 100b and the side hole 100c.

Referring to FIGS. 3 to 5, the gas furnace 100 includes a fuel valve 120, a manifold 130, a burner box 140, a burner 141, a heat exchanger 150, a collect box 160, and an inducer 170.

The fuel valve 120 may supply fuel from a fuel pipe FP connected to a fuel source (not shown) to the manifold 130, or may block the supply of the fuel to the manifold 130. For example, the fuel may be Liquefied Natural Gas (LNG) or Liquefied Petroleum Gas (LPG). Meanwhile, by adjusting an opening degree of the fuel valve 120, it is possible to adjust an amount of the fuel supplied to the manifold 130.

The burner 141 may receive the fuel from the manifold 130. The fuel may be mixed with air, and the burner 141 may burn a mixture of the fuel and the air. When the mixture of fuel and air is combusted, a flame Fm (see FIGS. 4 and 5) and a high-temperature combustion gas Fg (see FIGS. 4 and 5) may be generated. For example, the burner 141 may be provided in plural. A plurality of burners 141 may be installed inside the burner box 140. The burner box 140 may be installed to the left of the first plate 111 of the mount plate 110.

For example, an igniter may be adjacent to an exit of a burner located at one end of the plurality of burners 141 and may burn fuel that has passed through the corresponding burner. In this case, the flame formed at the outlet of the burner may be propagated to exits of the remaining burners through a flame propagation port between the plurality of burners 141. The propagated flame may burn fuel that has passed through the remaining burners. In addition, a flame detector may be adjacent to an exit of a burner located at the other end of the plurality of burners 141. When the flame detector detects a flame, it may be considered that a flame is formed as a result of combustion by the remaining burners due to characteristics of the flame propagation described above.

The heat exchanger 150 may be located in the second space 102S between the top plate 10b and the bottom plate 10c. The heat exchanger 150 may provide a passage for the combustion gas Fg. One end of the heat exchanger 150 may be coupled to the right of the first plate 111 of the mount plate 110, and may communicate with the burner 141. The other end of the heat exchanger 150 may be spaced apart from the one end of the heat exchanger 150, and may be coupled to the right of the first plate 111. In this case, a first hole (not shown) may be formed to penetrate the first plate 111 in the left-right direction, and may be located between the one end of the heat exchanger 150 and the burner 141.

In addition, the heat exchanger 150 may be provided in plural. The number of heat exchangers 150 may be equal to the number of burners 141. Each of a plurality of heat exchangers 150 may be connected to each of the plurality of burners 141. The plurality of heat exchangers 150 may be spaced apart from each other in the front-rear direction.

In addition, the heat exchanger 150 may be a tubular type heat exchanger. The heat exchanger 150 may include a first tube 150a, a bend 150b, and a second tube 150c. The passage of the combustion gas Fg may be formed in the inside of the first tube 150a, the inside of the bend 150b, bend, and the inside of the second tube 150c. For example, a diameter of the first tube 150a may be substantially equal to a diameter of the bend 150b and a diameter of the second tube 150c.

The first tube 150a may extend long in the left-right direction. A left end of the first tube 150a may form the one end of the heat exchanger 150, and may be coupled to the right of the first plate 111. An entry (unsigned) of the heat exchanger 150 may be formed at the left end of the first tube 150a.

The second tube 150c may extend long in the left-right direction. The second tube 150c may be spaced upwardly from the first tube 150a. A left end of the second tube 150c may form the other end of the heat exchanger 150 and may be coupled to the right of the first plate 111. An exit (unsigned) of the heat exchanger may be formed at the left end of the second tube 150c.

The band 150b may be connected to the right end of the first tube 150a and the right end of the second tube 150c. The band 150b may be convex to the right. The band 150b may transfer the combustion gas Fg that has passed through the first tube 150a to the second tube 150c. Accordingly, the combustion gas Fg may flow to the right in the first tube 150a, and may flow to the left in the second tube 150b. The band 150b may be referred to as a U-shaped bend. Meanwhile, according to an embodiment, a bend connected to the left end of the second tube 150c and convex to the left, and a tube connected to the bend and disposed in parallel with the second tube 150c may be added.

A pillar P1 and P2 may be coupled to the bottom plate 10c and may be coupled to the bottom of the top plate 10b. A vertical portion (unsigned) of the pillar P1 and P2 may extend long in the up-down direction between the bottom plate 10c and the top plate 10b. A horizontal portion (unsigned) of the pillar P1 and P2 may extend long from the lower side of the top plate 10b in the front-rear direction. The pillar P1 and P2 may surround a portion of the outside of the heat exchanger 150. The pillar P1 and P2 may include a first pillar P1 and a second pillar P2, which are spaced apart from each other in the left-right direction.

The collect box 160 may be located above the burner box 140, and may be installed to the left of the first plate 111 of the mount plate 110. The collect box 160 may communicate with the other end of the heat exchanger 150. In this case, the second hole (not shown) may be formed to penetrate the first plate 111 in the left-right direction, and may be located between the other end of the heat exchanger 150 and the collect box 160. That is, the combustion gas Fg passing through the heat exchanger 150 may be introduced into the collector box 160.

The inducer 170 may be installed to the left of the collect box 160. An entry of the inducer 170 may communicate with the inside of the collect box 160. An exit 171 of the inducer 170 may be connected to the exhaust pipe 180 (see FIG. 2). The inducer 170 may cause the combustion gas Fg to flow through the heat exchanger 150, the collect box 160, the inducer 170, and the exhaust pipe 180. In addition, the inducer 170 may cause the mixture of fuel and air to flow through the burner 141. The inducer 170 may be referred to as a fan, a blower, or an induced draft motor (IDM).

The exhaust pipe 180 (see FIG. 2) may extend upward from the exit 171 of the inducer 170. The exhaust pipe 180 may pass through the second plate 112 of the mount plate 110, the horizontal plate 10a, and the first long side LS1, and may discharge the combustion gas Fg to the outside. The combustion gas Fg flowing through the exhaust pipe 180 may be referred to as exhaust gas.

Referring to FIGS. 3 and 4, for example, the bottom hole 100b may be opened and the side hole 100c may be closed. The side hole 100c may be closed by a detachable cover (not shown) or may not be initially formed in the side plate 10d.

The plurality of blades 16d may be rotated in a clockwise direction with respect to a center C of the blower 16 in response to driving of the motor 16a. Air discharged from the blower 16 may pass around the heat exchanger 150 through the top hole 100a. The air passing around the heat exchanger 150 may receive thermal energy from the combustion gas Fg flowing along the heat exchanger 150. That is, temperature of the air may be increased while the air passes around the heat exchanger 150.

In this case, the air supply duct may be coupled to a portion in which the bottom hole 100b of the bottom plate 10c is formed. That is, the air that has passed around the heat exchanger 150 may be supplied into an indoor space through the bottom hole 100b and the air supply duct (see SA in FIG. 4).

In another example with reference to FIGS. 3 and 5, the bottom hole 100b may be closed and the side hole 100c may be opened. The bottom hole 100b may be closed by a detachable cover (not shown) or may not be initially formed in the bottom plate 10c.

The plurality of blades 16d may be rotated in a clockwise direction with respect to a center C of the blower 16 in response to driving of the motor 16a. Air discharged from the blower 16 may pass around the heat exchanger 150 through the top hole 100a. The air passing around the heat exchanger 150 may receive thermal energy from the combustion gas Fg flowing along the heat exchanger 150. That is, temperature of the air may be increased while the air passes around the heat exchanger 150.

In this case, the air supply duct may be coupled to a portion in which the side hole 100c of the side plate 10d is formed. That is, the air that has passed around the heat exchanger 150 may be supplied to an indoor space through the side hole 100c and the air supply duct (see SA in FIG. 5).

Referring to FIGS. 6 and 7, the heat exchanger 150 may include six heat exchangers 151, 152, 153, 154, 155, and 156 which are spaced apart from each other in the front-rear direction. However, the number of heat exchangers 150 is not limited thereto. A first heat exchanger 151, a second heat exchanger 152, a third heat exchanger 153, a fourth heat exchanger 154, a fifth heat exchanger 155, and a sixth heat exchanger 156 may be sequentially arranged in the left-right direction. In this case, the burner 141 may include six burners connected to the six heat exchangers 151, 152, 153, 154, 155, and 156.

The plurality of guides 190 may be coupled to an outer circumferential surface of the heat exchanger 150. The plurality of guides 190 may be disposed vertically to the heat exchanger 150. The plurality of guides 190 may be spaced apart from each other in a longitudinal direction of the first tube 150a or the second tube 150c of the heat exchanger 150, that is, in the left-right direction. Each of the plurality of guides 190 may connect the plurality of heat exchangers 150. In other words, the plurality of heat exchangers 150 may pass through each of the plurality of guides 190. For example, the number of guides 190 may be eight. The plurality of guides 190 may include a plurality of lower guides 191, 192, 193, and 194 coupled to the outer circumferential surface of the first tube 150a, and a plurality of upper guides 195, 196, 197, and 198 coupled to the outer circumferential surface of the second tube 150c. Meanwhile, the guides 190 may be referred to as baffles.

The plurality of lower guides 191, 192, 193, and 194 may be disposed vertically to the first tube 150a. A lower end of each of the plurality of lower guides 191, 192, 193, and 194 may be coupled to an upper surface of the bottom plate 10c. An upper end of each of the plurality of lower guides 191, 192, 193, and 194 may be spaced downward from the second tube 150c. The first lower guide 191, the second lower guide 192, the third lower guide 193, and the fourth lower guide 194 may be sequentially arranged along the longitudinal direction of the first tube 150a. Specifically, the first lower guide 191 may be adjacent to a left end of the first tube 150a, and the fourth lower guide 194 may be adjacent to a right end of the first tube 150a. In addition, the second lower guide 192 and the third lower guide 193 may be positioned between the first lower guide 191 and the fourth lower guide 194.

The plurality of upper guides 195, 196, 197, and 198 may be disposed vertically to the second tube 150c. An upper end of each of the plurality of upper guides 195, 196, 197, and 198 may be coupled to a lower surface of the top plate 10b. A lower end of each of the plurality of upper guides 195, 196, 197, and 198 may be spaced upward from the first tube 150a. The first upper guide 195, the second upper guide 196, the third upper guide 197, and the fourth upper guide 198 may be sequentially arranged along the longitudinal direction of the second tube 150c. Specifically, the first upper guide 195 may be adjacent to a right end of the second tube 150c, and the fourth upper guide 198 may be adjacent to a left end of the second tube 150c. In addition, the second upper guide 196 and the third upper guide 197 may be positioned between the first upper guide 195 and the fourth upper guide 198.

In addition, in the left-right direction which is the longitudinal direction of the first tube 150a or the third tube 150c, the plurality of upper guides 195, 196, 197, and 198 and the plurality of lower guides 191, 192, 193, and 194 may be alternately arranged. In other words, in the up-down direction in which the first tube 150a and the third tube 150c are spaced apart from each other, the plurality of upper guides 195, 196, 197, and 198 and the plurality of lower guides 191, 192, 193, and 194 may be alternately arranged.

In addition, the second space 102S between the top plate 10b and the bottom plate 10c may be opened through the top hole 100a and the bottom hole 100b. The top hole 100a and the bottom hole 100b may be formed to be elongated in the left-right direction. The bottom hole 100b may face the top hole 100a with respect to the heat exchanger 150. The plurality of guides 190 may be disposed in an area between the top hole 100a and the bottom hole 100b.

Accordingly, the plurality of guides 190 may disperse air, flowing from the top hole 100a to the bottom hole 100b by the blower 16, in the longitudinal direction of the heat exchanger 150, that is, in the left-right direction. In this case, air may pass around the heat exchanger 150 in a relatively wide area (see SA of FIG. 7), compared to a case in which the plurality of guides 190 are not provided (see FIG. 4). In other words, an amount of heat transfer between air and the heat exchanger 150 occupying a relatively small space may be sufficiently secured by the plurality of guides 190.

Referring to FIGS. 8 and 9, the second space 102S between the top plate 10b and the bottom plate 10c may be opened through the top hole 100a and the side hole 100c.

Referring to FIG. 8, for example, the top hole 100a may be positioned to be biased leftward with respect to the center C of the blower 16. The top hole 100a may be adjacent to the first plate 111 of the mount plate 110. For another example with reference to FIG. 3, the top hole 100a may be positioned to be symmetric in the left-right direction with respect to the center C of the blower 16. The side hole 100c may be located to the right of the heat exchanger 150.

Therefore, the plurality of guides 190 may increase a length of a passage for the air flowing from the top hole 100a to the side hole 100c by the blower 16. In other words, in the up-down direction, air may flow in a zigzag fashion by the plurality of guides 190 (see SA of FIG. 9). In this case, a residence time of air around the heat exchanger 150 may be increased, compared to a case in which the plurality of guides 190 are not provided (see FIG. 5). In other words, an amount of heat transfer between air and the heat exchanger 150 occupying a relatively small space may be sufficiently secured by the plurality of guides 190.

Referring to FIGS. 10 and 11, a plurality of lower bending portions 191a, 192a, 193a, and 194a may be bent to the left by an acute angle at upper ends of the plurality of lower guides 191, 192, 193, and 194, respectively. The plurality of upper bending portions 195a, 196a, and 197a may be bent to the right by an acute angle at lower ends of the plurality of upper guides 195, 196, and 197, respectively.

A first lower bending portion 191a may be bent to the left by a first angle theta 1 from an upper end of the first lower guide 191. A second lower bending portion 192a may be bent to the left by a second angle theta 2 from an upper end of the second lower guide 192. A third lower bending portion 193a may be bent to the left by a third angle theta 3 from an upper end of the third lower guide 193. A fourth lower bending portion 194a may be bent to the left by a fourth angle theta 4 from an upper end of the fourth lower guide 194. For example, the first angle theta 1 may be substantially equal to the second angle theta 2, the third angle theta 3, and the fourth angle theta 4.

A first upper bending portion 195a may be bent to the right by a fifth angle theta 5 from a lower end of the first upper guide 195. A second upper bending portion 196a may be bent to the right by a sixth angle theta 6 from a lower end of the second upper guide 196. A seventh upper bending portion 197a may be bent to the right by a seventh angle theta 7 from a lower end of the seventh upper guide 197. For example, the fifth angle theta 5 may be substantially equal to the sixth angle theta 6 and the seventh angle theta 7.

For example, the fifth angle theta 5, the sixth angle theta 6, and the seventh angle theta 7 may be substantially equal to the first angle theta 1, the second angle theta 2, the third angle theta 3, and the fourth angle theta 4. That is, bending directions of the plurality of lower bending portions 191a, 192a, 193a, and 194a relative to the plurality of lower guides 191, 192, 193, and 194 may be parallel to bending directions of the plurality of upper guides 195, 196, and 197 relative to the plurality of upper bending portions 195a, 196a, and 197a.

In addition, in the aforementioned upper bending directions, the plurality of lower bending portions 191a, 192a, 193a, and 194a may be respectively spaced apart from and face the plurality of upper guides 195, 196, and 197 adjacent thereto. Specifically, in the bending direction of the first upper bending portion 195a relative to the first upper guide 195, the first upper bending portion 195a may be adjacent to and face the fourth lower bending portion 194a. In the bending direction of the second upper bending portion 196a relative to the second upper guide 196, the second upper bending portion 196a may be adjacent to and face the third lower bending portion 193a. In the bending direction of the third upper bending portion 197a relative to the third upper guide 197, the third upper bending portion 197a may be adjacent to and face the second lower bending portion 192a.

In addition, the plurality of lower bending portions 191a, 192a, 193a, and 194a may be positioned below a first reference line CL1, and the plurality of upper bending portions 195a, 196a, and 197a may be positioned above the first reference line CL1. In this case, the first reference line CL1 may be a virtual line extending in the left-right direction between the first tube 150a and the second tube 150b, and may cross the center of the bend 150b.

Accordingly, the plurality of upper bending portions 195a, 196a, and 197a may guide air, which is flowing mainly to the left of the heat exchanger 150 due to the characteristics of the blower 16, to the lower right side. In addition, the plurality of lower bending portions 191a, 192a, 193a, and 194a may guide air, which is guided by the plurality of upper bending portions 195a, 196a, and 197a, to an area around the first tube 150a. Air may pass around the heat exchanger 150 in a wider area by the plurality of upper bending portions 195a, 196a, and 197a and the plurality of lower bending portions 191a, 192a, 193a, and 194a. That is, efficiency of heat transfer between the heat exchanger 150 and the air may be further increased.

Meanwhile, according to an embodiment, any one in the plurality of upper bending portions 195a, 196a, and 197a and the plurality of lower bending portions 191a, 192a, 193a, and 194a may be omitted.

Referring to FIGS. 12 and 13, a second reference line CL2 may be a virtual line extending in the left-right direction between the second tube 150b and the top plate 10b. A distance d2 between the second reference line CL2 and the first reference line CL1 may be equal to a distance d1 between the first reference line CL1 and the bottom plate 10c. For example, the second reference line CL2 may be positioned below the top plate 10b. In addition, as described above, the plurality of upper guides 195, 196, and 197 may be coupled to the lower surface of the top plate 10b, and the plurality of lower guides 191, 192, 193 and 194 may be coupled to an upper surface of the bottom plate 10c. That is, in the up-down direction, a height of the upper guides 195, 196, and 197 may be higher than a height of the lower guides 191, 192, 193, and 194 by a distance d3 between the second reference line CL2 and the top plate 10b.

A plurality of openings 195h, 196h, and 197h may be respectively formed to penetrate the plurality of upper guides 195, 196, and 197 in the left-right direction, and may be elongated in the front and rear directions. The plurality of openings 195h, 196h, and 197h may be aligned along the second reference line CL2.

Accordingly, some of the air flowing by the blower 16 (see FIGS. 7 and 9) may pass through the plurality of openings 195h, 196h, and 197h. That is, the plurality of openings 195h, 196h, and 197h may minimize generation of air vortex or a flow loss of air between the second tube 150c and the top plate 10b.

A plurality of left protrusions 195b, 196b, and 197b may respectively protrude obliquely leftward of the plurality of openings 195h, 196h, and 197h from lower ends of the plurality of openings 195h, 196h, and 197h. A plurality of right protrusions 195c, 196c, and 197c may respectively protrude obliquely rightward of the plurality of openings 195h, 196h, and 197h from upper ends of the plurality of openings 195h, 196h, and 197h.

For example, the left protrusions 195b, 196b, and 197b and the right protrusions 195, 196c and 197c may be formed by cutting and bending respective portions of the upper guides 195, 196 and 197. In this case, the openings 195h, 196h, and 197h may be formed in cut portions of the upper guides 195, 196, and 197. In another example, the left protrusions 195b, 196b, and 197b and the right protrusions 195, 196c, and 197c may be respectively coupled to the lower and upper ends of the openings 195h, 196h, and 197h by welding or the like.

A first left protrusion 195b may protrude from a lower end of the first opening 195h to the left of the first opening 195h, and may form an eighth angle theta 5b relative to the first opening 195h. A second left protrusion 196b may protrude from a lower end of the second opening 196h to the left of the second opening 196h, and may form a ninth angle theta 6b relative to the second opening 196h. A third left protrusion 197b may protrude from a lower end of the third opening 197h to the left of the third opening 197h, and may form a tenth angle theta 7b relative to the third opening 197h. For example, the eighth angle theta 5b may be substantially equal to the ninth angle theta 6b and the tenth angle theta 7b.

A first right protrusion 195c may protrude from an upper end of the first opening 195h to the right of the first opening 195h, and may form an eleventh angle theta 5c relative to the first opening 195h. A second right protrusion 196c may protrude from an upper end of the second opening 196h to the right of the second opening 196h, and may form a twelfth angle theta 6c relative to the second opening 196h. A third right protrusion 197c may protrude from an upper end of the third opening 197h to the right of the third opening 197h, and may form a thirteenth angle theta 7c relative to the third opening 197h. For example, the eleventh angle theta 5c may be substantially equal to the twelfth angle theta 6c and the thirteenth angle theta 7c.

Accordingly, in the vicinity of the plurality of openings 195h, 196h, and 197h, the plurality of left protrusions 195b, 196b, and 197b and the plurality of right protrusions 195c, 196c, and 197c may guide air to easily pass through the plurality of openings 195h, 196h, and 197h. In particular, the plurality of right protrusions 195c, 196c, and 197c may guide the air passing through the plurality of openings 195h, 196h, and 197h to flow downward to the right. That is, efficiency of heat transfer between the heat exchanger 150 and the air may be further increased by the left protrusions 195b, 196b, and 197b and the right protrusions 195c, 196c, and 197c.

Referring to FIGS. 14 and 15, the guide 190 may include a first part 190a and a second part 190b. The first part 190a and the second part 190b may extend long in the front-rear direction and may have the same width W. Meanwhile, the first part 190a may be referred to as a first plate or a first panel, and the second part 190b may be referred to as a second plate or a second panel.

The first part 190a may extend long in the front-rear direction. The width W of the first part 190a may be defined in the front-rear direction, a height of the first part 190a may be defined in the up-down direction, and a thickness of the first part 190a may be defined in the left-right direction. A left surface and a right surface of the first part 190a may be flat.

A plurality of lower grooves (unsigned) may be formed to be recessed downward from an upper side of the first part 190a, and may be spaced apart from each other in the front-rear direction. The number of the lower grooves may be equal to the number of heat exchangers 150. A shape of each of the lower grooves may be identical to a shape of a lower portion of the first tube 150a of the heat exchanger 150. That is, each of the lower grooves may have a semicircular shape. A plurality of lower ribs 190c1, 190d1, 190e1, 190f1, 190g1, and 190h1 may protrude leftward from the plurality of lower grooves, respectively, and may extend along the plurality of lower grooves, respectively.

A plurality of couplers 190t may be positioned between the plurality of lower ribs 190c1, 190d1, 190e1, 190f1, 190g1, and 190h1, and may protrude leftward from a left surface of the first part 190a.

The second part 190b may extend long in the front-rear direction. The width W of the second part 190b may be defined in the front-rear direction, a height of the second part 190b may be defined in the up-down direction, and a thickness of the second part 190b may be defined in the left-right direction. A left surface and a right surface of the second part 190b may be flat.

A plurality of upper grooves (unsigned) may be formed to be recessed upward from a lower side of the second part 190b, and may be spaced apart from each other in the front-rear direction. The number of the upper grooves may be equal to the number of heat exchangers 150. A shape of each of the upper grooves may be identical to a shape of an upper portion of the first tube 150a of the heat exchanger 150. That is, each of the upper grooves may have a semicircular shape. A plurality of upper ribs 190c2, 190d2, 190e2, 190f2, 190g2, and 190h2 may protrude leftward from the plurality of upper grooves, respectively, and may extend along the plurality of upper grooves, respectively.

A plurality of through holes 190c, 190d, 190e, 190f, 190g, and 190h may be formed between the plurality of upper ribs 190c2, 190d2, 190e2, 190f2, 190g2, 190h2 and the plurality of lower ribs 190c1, 190d1, 190e1, 190f1, 190g1, and 190h1. In addition, a diameter of each of the plurality of through holes 190c, 190d, 190e, 190f, 190g, and 190h may be substantially equal to an outer diameter of each of the plurality of heat exchangers 151, 152, 153, 154, 155, and 156.

Specifically, a first through hole 190c may be formed between a first upper rib 190c2 and a first lower rib 190c1, and may have a diameter equal to an outer diameter of the first heat exchanger 151. A second through hole 190d may be formed between a second upper rib 190d2 and a second lower rib 190d1 and may have a diameter equal to an outer diameter of the second heat exchanger 152. A third through hole 190e may be formed between a third upper rib 190e2 and a third lower rib 190e1 and may have a diameter equal to an outer diameter of the third heat exchanger 153. A fourth through hole 190f may be formed between a fourth upper rib 190f2 and a fourth lower rib 190f1 and may have a diameter equal to an outer diameter of the fourth heat exchanger 154. A fifth through hole 190g may be formed between a fifth upper rib 190g2 and a fifth lower rib 190g1, and may have a diameter equal to an outer diameter of the fifth heat exchanger 155. A sixth through hole 190h may be formed between a sixth upper rib 190h2 and a sixth lower rib 190h1, and may have a diameter equal to an outer diameter of the sixth heat exchanger 156.

A stepped portion 190P may protrude downward from a lower end of the second part 190b, and may be formed to be rightward down from the second part 190b. That is, the stepped portion 190P may be stepped with respect to the second part 190b. For example, the stepped portion 190P may be formed while a portion of the left surface of the second part 190b is pressed to the right, and may be referred to as a pressed portion. In the up-down direction, portions of the stepped portion 190P corresponding to the plurality of upper grooves may be cut-out.

A plurality of coupling holes 190u may be positioned between the plurality of upper ribs 190c2, 190d2, 190e2, 190f2, 190g2, and 190h2, and may be formed to penetrate the stepped portion 190P in the left-right direction.

Accordingly, a left surface of the stepped portion 190P may contact a right surface of an upper portion of the first part 190a, and a lower side of the second part 190b may be seated on an upper side of the first part 190a. In the left and right direction, the plurality of coupling holes 190u may be aligned with the plurality of coupling holes 190t. As fastening members (not shown), such as screws, are fastened to the coupling holes 190t and the coupling holes 190u, the second part 190b may be detachably coupled to the first part 190a.

A pair of legs 190Ma and 190Mb may extend rightward from the lower end of the first part 190a, and may be spaced apart from each other in the front-rear direction. The pair of legs 190Ma and 190Mb may be orthogonal to the first part 190a. A first leg 190Ma may be adjacent to a front end of the first part 190a and may be positioned on a third plate 10c (see FIGS. 6 and 8). As a fastening member, such as a screw, passes through a hole 190aa formed in the first leg 190Ma and is then fastened to the bottom plate 10c, the first leg 190Ma may be coupled to the bottom plate 10c. A second leg 190Mb may be adjacent to a rear end of the first part 190b and may be positioned on the third plate 10c (see FIGS. 6 and 8). As a fastening member, such as a screw, passes through the hole 190bb formed in the second leg 190Mb and is then fastened to the bottom plate 10c, the second leg 190Mb may be coupled to the bottom plate 10c.

Accordingly, a plurality of first tubes 150a of the plurality of heat exchangers 151, 152, 153, 154, 155, and 156 may be seated on the plurality of lower ribs 190c1, 190d1, 190e1, 190f1, 190g1, and 190h1 of the first part 190a coupled to the bottom plate 10c. In addition, the second part 190b may be seated on the plurality of first tubes 150a of the plurality of heat exchangers 151, 152, 153, 154, 155, and 156, and may be coupled to the first part 190a. That is, the plurality of first tubes 150a of the plurality of heat exchangers 151, 152, 153, 154, 155, and 156 may pass through the plurality of throughholes 190c, 190d, 190e, 190f, 190g, and 190h of the guide 190, and may be integrally coupled to the bottom plate 10c by the guide 190. That is, convenience of installation of the heat exchanger and the guide may be improved. In addition, the guide 190 may reduce or present the shaking of the plurality of heat exchangers 151, 152, 153, 154, 155, and 156.

Meanwhile, the left surface of the second part 190b may be disposed parallel to the left surface of the first part 190a. That is, the left surface of the guide 190 may be formed to be flat. In this case, a flow resistance of air in contact with the left surface of the guide 190 may be minimized.

Referring to FIGS. 6, 8, and 15, the plurality of lower guides 191, 192, 193, and 194 may have the same shape. The plurality of upper guides 195, 196, 197, and 198 may have the same shape.

In addition, the plurality of lower guides 191, 192, 193, and 194 and the plurality of upper guides 195, 196, 197 and 198 may have the same overall shape. That is, the description of the guide 190 provided above with reference to FIGS. 14 and 15 may apply not just to the plurality of lower guides 191, 192, 193, and 194, but also to the plurality of upper guides 195, 196, 197, and 198.

For example, a height h1 of each of the plurality of lower guides 191, 192, 193, and 194 may be smaller than a height h2 of each of the plurality of upper guides 195, 196, 197 and 198. In this case, a shape of a second part 190b of each of the lower guides 191, 192, 193, and 194 may be identical to a shape of a second part 190b of each of the upper guides 195, 196, 197, and 198. In addition, putting aside a height difference, a shape of a first part 190a of each of the lower guides 191, 192, 193, and 194 may be identical to a shape of a first part 190a of each of the upper guides 195, 196, 197, and 198.

In another example, a height of each of the plurality of lower guides 191, 192, 193, and 194 may be equal to a height of each of the plurality of upper guides 195, 196, 197 and 198. In this case, the shape of each of the lower guides 191, 192, 193, and 194 may be identical to the shape of each of the upper guides 195, 196, 197 and 198.

Accordingly, at least one of the lower guides 191, 192, 193, and 194 may be compatible with at least one of the upper guides 195, 196, 197, and 198. The lower guides 191, 192, 193, and 194 may be penetrated by the plurality of first tubes 150a of the plurality of heat exchangers 151, 152, 153, 154, 155, and 156, and may be coupled to the upper surface of the bottom plate 10C through the pair of legs 190Ma and 190Mb. The upper guides 195, 196, 197, and 198 may be penetrated by the plurality of second tubes 150c of a plurality of heat exchangers 151, 152, 153, 154, 155, and 156, and may be coupled to the lower surface of the top plate 10b through the pair of legs 190Mb and 190Ma.

Meanwhile, the same description about the shape compatibility regarding the lower guides 191, 192, 193, and 194 and the upper guides 195, 196, 197, and 198 may apply to the lower guides 191, 192, 193, and 194 and the upper guides 195, 196, and 197 with the bending portions and protrusions described above with reference to FIG. 10 or 12.

Certain embodiments or other embodiments of the disclosure described above are not mutually exclusive or distinct from each other. Any or all components of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure.

What is claimed is:

1. A gas furnace, comprising:
a burner configured to burn fuel;
a heat exchanger that extends longitudinally and provides a passage for combustion gas generated by the burner;
a blower configured to cause a flow of air passing around the heat exchanger;
a plurality of guides through which the heat exchanger penetrates and spaced apart from each other in a longitudinal direction of the heat exchanger;
a top plate positioned between the heat exchanger and the blower, and having a top hole through which air passes;
a bottom plate that faces the top plate with respect to the heat exchanger;
a mount plate positioned between the burner and the heat exchanger; and
a side plate that faces the mount plate with respect to the heat exchanger, wherein the heat exchanger comprises:
a first tube that forms an entry of the heat exchanger;
a second tube that forms an exit of the heat exchanger and spaced apart from the first tube in a direction crossing the longitudinal direction of the heat exchanger; and
a bend that connects the first tube and the second tube, wherein the plurality of guides is alternately disposed in a direction in which the first tube and the second tube are spaced apart from each other, wherein the first tube and the second tube extend in the longitudinal direction of the heat exchanger, wherein the plurality of guides comprises:
a plurality of lower guides penetrated by the first tube and sequentially arranged along the first tube; and
a plurality of upper guides penetrated by the second tube and sequentially arranged along the second tube, wherein the plurality of lower guides is disposed vertically with respect to the first tube and spaced apart from the second tube, wherein the plurality of upper guides is disposed vertically with respect to the second tube and spaced apart from the first tube, wherein the plurality of upper guides is positioned above a first reference line that extends in the longitudinal direction of the heat exchanger between the first tube and the second tube and intersects a center of the bend, wherein the plurality of lower guides is positioned below the first reference line, wherein a distance between the first reference line and a second reference line that extends in the longitudinal direction of the heat exchanger between the second tube and the top plate and positioned below the top plate is equal to a distance between the first reference line and the bottom plate, and wherein the plurality of upper guides respectively further comprises openings formed to pass through the plurality of upper guides and aligned with the second reference line.

2. The gas furnace of claim 1, wherein the bottom plate further comprises a bottom hole formed to penetrate the bottom plate, and wherein the top hole and the bottom hole are formed to extend in the longitudinal direction of the heat exchanger and face each other in a direction in which the first tube and the second tube are spaced apart from each other.

3. The gas furnace of claim 1, wherein the side plate further comprises a side hole formed to penetrate the side plate, and wherein the top hole is positioned to be biased toward the mount plate with respect to a center of the blower.

4. The gas furnace of claim 1, wherein the plurality of upper guides further comprises upper bending portions bent toward the side plate by an acute angle at lower ends of the plurality of upper guides, respectively.

5. The gas furnace of claim 4, wherein the plurality of lower guides further comprises lower bending portions bent toward the mount plate by an acute angle at upper ends of the plurality of lower guides, respectively.

6. The gas furnace of claim 5, wherein the upper bending portions are adjacent to the lower bending portions in bending directions of the upper bending portions with respect to the plurality of upper guides, respectively.

7. The gas furnace of claim 1, wherein the mount plate is positioned at a lateral side of the heat exchanger, and wherein the plurality of upper guides further comprises:
first protrusions that protrude obliquely in a first lateral direction of the openings from lower ends of the openings; and
second protrusions that protrude obliquely in a second lateral direction of the openings from upper ends of the openings.

8. The gas furnace of claim 1, wherein the longitudinal direction of the heat exchanger is defined as a first direction, wherein the direction in which the first tube and the second tube are spaced apart from each other is defined as a second direction, wherein a direction orthogonal to the first direction and the second direction is defined as a third direction, and wherein the heat exchanger further comprises a plurality of heat exchangers spaced apart from each other in the third direction.

9. The gas furnace of claim 8, wherein the plurality of lower guides extends in the third direction and is penetrated by a plurality of first tubes of the plurality of heat exchangers, and wherein the plurality of upper guides extends in the third direction and is penetrated by a plurality of second tubes of the plurality of heat exchangers.

10. The gas furnace of claim 9, wherein the plurality of lower guides further comprises:
a first portion; and
a second portion detachably coupled to the first portion in the second direction, and wherein the plurality of first tubes passes through a plurality of through-holes formed between the first portion and the second portion.

11. The gas furnace of claim 10, wherein the plurality of through-holes is formed between a plurality of lower grooves of the first portion and a plurality of upper grooves of the second portion, wherein the first portion further comprises a plurality of lower ribs that respectively protrudes in the first direction from the plurality of lower grooves and respectively extends along the plurality of lower grooves, and wherein the second portion further comprises a plurality of upper ribs that respectively protrudes in the first direction from the plurality of upper grooves and respectively extends along the plurality of upper grooves.

12. The gas furnace of claim 10, wherein the second portion further comprises a stepped portion that protrudes from one end of the second portion facing the first portion and being stepped with respect to the second portion, wherein the one end of the second portion is seated on one end of the first portion facing the second portion, and wherein the stepped portion is detachably coupled to the first portion.

13. The gas furnace of claim 10, wherein the first portion further comprises a pair of legs that extends from the first portion in the second direction and spaced apart from each other in the third direction.

14. The gas furnace of claim 10, wherein at least one of the plurality of upper guides is compatible with at least one of the plurality of lower guides.

15. An air conditioner having an outdoor unit and a ventilator that are connected to each other through a refrigerant pipe, wherein the ventilator comprises:
an air supply fan that forms a flow of air along an air supply passage;
an exhaust fan that forms a flow of air along an exhaust passage separated from the air supply passage;
a plurality of coils located in the air supply passage and having refrigerant flowing therethrough; and
the gas furnace of claim 1, wherein the gas furnace is positioned downstream of the plurality of coils in the air supply passage.

* * * * *